(12) United States Patent
Horner et al.

(10) Patent No.: US 10,114,119 B2
(45) Date of Patent: Oct. 30, 2018

(54) SONAR SYSTEMS AND METHODS USING INTERFEROMETRY AND/OR BEAMFORMING FOR 3D IMAGING

(71) Applicant: NAVICO HOLDING AS, Egersund (NO)

(72) Inventors: Ronald Joe Horner, Collinsville, OK (US); Alan Lee Proctor, Owasso, OK (US)

(73) Assignee: NAVICO HOLDING AS, Egersund (NO)

( * ) Notice: Subject to any disclaimer, the term of this patent is extended or adjusted under 35 U.S.C. 154(b) by 228 days.

(21) Appl. No.: 14/717,458

(22) Filed: May 20, 2015

(65) Prior Publication Data

US 2016/0341827 A1 Nov. 24, 2016

(51) Int. Cl.
*G03H 3/00* (2006.01)
*G01S 15/89* (2006.01)
*G01S 7/62* (2006.01)

(52) U.S. Cl.
CPC ........ *G01S 15/8902* (2013.01); *G01S 7/6245* (2013.01); *G01S 15/89* (2013.01)

(58) Field of Classification Search
USPC ............................................................ 367/8
See application file for complete search history.

(56) References Cited

U.S. PATENT DOCUMENTS 3,311,871 A * 3/1967 Baron ..................... G01S 3/805
367/122
3,436,721 A * 4/1969 Farr ......................... G01S 13/60
342/107

(Continued)

FOREIGN PATENT DOCUMENTS

WO WO 2007/025572 3/2007
WO WO 2008/105932 9/2008

(Continued)

OTHER PUBLICATIONS

U.S. Appl. No. 62/128,635, filed Mar. 5, 2015, In re: Procter et al. entitled *Systems and Associated Methods for Producing a 3D Sonar Image*.

(Continued)

*Primary Examiner* — Isam A Alsomiri
*Assistant Examiner* — Jonathan D Armstrong
(74) *Attorney, Agent, or Firm* — Nelson Mullins Riley & Scarborough LLP

(57) ABSTRACT

Provided are a sonar system, transducer assembly, and method for imaging an underwater environment. The sonar system may include a housing having a transducer array defining first and second rows of transducer elements positioned at a predetermined distance. The first row of transducer elements may include at least first and second transducer elements configured to convert sound energy into first and second sonar return data. The second row of transducer elements may include at least third and fourth transducer elements configured to convert sound energy into third and fourth sonar return data. A sonar signal processor may be configured to process the first and second sonar return data and third and fourth sonar return data to generate respective first and second array sonar return data corresponding to a plurality of first and second receive beams and generate 3D sonar return data by correlating the angles associated with the receive beams.

51 Claims, 17 Drawing Sheets

(56) References Cited

U.S. PATENT DOCUMENTS

| | | | |
|---|---|---|---|
| 4,244,026 A | 1/1981 | Dickey, Jr. | |
| 4,879,697 A | 11/1989 | Lowrance et al. | |
| 4,965,776 A | 10/1990 | Mueller | |
| 5,025,423 A | 6/1991 | Earp | |
| 5,050,133 A * | 9/1991 | Buddery | G01S 15/60 367/91 |
| 5,103,129 A | 4/1992 | Slayton et al. | |
| 5,184,330 A | 2/1993 | Adams et al. | |
| 5,235,857 A | 8/1993 | Anderson | |
| 5,305,286 A | 4/1994 | Woodsum et al. | |
| 5,532,700 A | 7/1996 | Lockwood | |
| 6,058,075 A | 5/2000 | Bourdelais | |
| 6,120,450 A * | 9/2000 | Li | G01S 15/8927 600/447 |
| 6,130,641 A | 10/2000 | Kraeutner et al. | |
| 6,201,767 B1 | 3/2001 | Lagrace et al. | |
| 6,285,628 B1 * | 9/2001 | Kiesel | G01S 15/89 367/103 |
| 6,438,071 B1 * | 8/2002 | Hansen | G01S 15/89 367/88 |
| 7,307,914 B1 | 12/2007 | Carter | |
| 8,300,499 B2 | 10/2012 | Coleman et al. | |
| 8,305,840 B2 | 11/2012 | Maguire | |
| 8,605,550 B2 * | 12/2013 | Maguire | G01S 15/89 367/88 |
| 8,717,847 B2 | 5/2014 | Blake | |
| 9,664,783 B2 | 5/2017 | Brown et al. | |
| 9,766,328 B2 | 9/2017 | Black et al. | |
| 9,784,825 B2 | 10/2017 | Brown et al. | |
| 9,784,826 B2 | 10/2017 | Matson et al. | |
| 9,812,118 B2 | 11/2017 | Matson et al. | |
| 2002/0035444 A1 * | 3/2002 | Wilkerson | G01P 5/001 702/159 |
| 2002/0167862 A1 | 11/2002 | Tomasi et al. | |
| 2003/0081503 A1 * | 5/2003 | Barnard | G01S 3/8086 367/103 |
| 2003/0235112 A1 * | 12/2003 | Zimmerman | G01S 7/521 367/4 |
| 2004/0165479 A1 * | 8/2004 | Scoca | G01S 15/60 367/100 |
| 2005/0007880 A1 * | 1/2005 | Zimmerman | G01S 7/5273 367/103 |
| 2005/0099887 A1 * | 5/2005 | Zimmerman | G01S 7/52003 367/12 |
| 2005/0101867 A1 | 5/2005 | Johnson et al. | |
| 2005/0195103 A1 * | 9/2005 | Davis | G01S 3/74 342/99 |
| 2006/0013066 A1 | 1/2006 | Nishimori et al. | |
| 2007/0044559 A1 | 3/2007 | Andrews | |
| 2007/0285315 A1 * | 12/2007 | Davis | G01S 3/74 342/377 |
| 2010/0067822 A1 * | 3/2010 | Young | G06T 3/4069 382/264 |
| 2010/0080082 A1 | 4/2010 | Betts et al. | |
| 2010/0170617 A1 * | 7/2010 | Woods | B06B 1/0633 156/73.6 |
| 2011/0013484 A1 | 1/2011 | Coleman et al. | |
| 2011/0013485 A1 | 1/2011 | Maguire | |
| 2012/0163126 A1 | 6/2012 | Campbell et al. | |
| 2012/0281507 A1 | 11/2012 | Rikoski | |
| 2013/0208568 A1 | 8/2013 | Coleman | |
| 2014/0010048 A1 | 1/2014 | Proctor | |
| 2014/0010049 A1 | 1/2014 | Proctor | |
| 2014/0269163 A1 | 9/2014 | Proctor | |
| 2014/0269192 A1 | 9/2014 | Proctor | |
| 2015/0369908 A1 * | 12/2015 | Zimmerman | G01S 15/96 367/7 |
| 2016/0232884 A1 | 8/2016 | Parks | |
| 2016/0259049 A1 * | 9/2016 | Proctor | G01S 15/8902 |
| 2016/0259053 A1 * | 9/2016 | Proctor | G01S 15/8902 |
| 2016/0341827 A1 * | 11/2016 | Horner | G01S 7/6245 |
| 2017/0082739 A1 * | 3/2017 | Horner | G01S 7/521 |
| 2017/0123062 A1 | 5/2017 | Coleman et al. | |
| 2017/0212230 A1 | 7/2017 | Wigh et al. | |

FOREIGN PATENT DOCUMENTS

| | | |
|---|---|---|
| WO | WO 2008/105932 A2 | 9/2008 |
| WO | WO 2010/100868 A1 | 9/2010 |

OTHER PUBLICATIONS

U.S. Appl. No. 62/128,641, filed Mar. 5, 2015, In re: Kirmani entitled *Methods and Apparatuses for Reconstructing a 3D Sonar Image*.

ITC Application Equations for Underwater Sound Transducers, Published by International Transducer Corporation, 1995, Rev. 8/00; 3 pages.

IEEE Xplore Abstract—A low-complexity data-dependent beamformer [online] [retrieved Nov. 12, 2015]. Retrieved from the Internet: <URL:http://ieeexplore.ieee.org/xpl/freeabs_all.jsp?arnumber=5716445&abstractAccess-no&us . . . > (Feb. 2011) 2 pages.

IEEE Xplore Abstract—Improving Sonar Performance in Shallow Water Using Adaptive . . . [online] [retrieved Nov. 12, 2015]. Retrieved from the Internet: <URL:http://ieeexplore.ieee.org/xpl/articleDetails.jsp?reload=true&arnumber=6401207>. (Apr. 2013) 2 pages.

European Search Report for European Application No. EP16170460.6 dated Sep. 23, 2016.

Kraeutner et al.; *Rethinking Forward-Looking Sonar for AUV'S: Combining Horizontal Beamforming with Vertical Angle-of-Arrival Estimation*; Teledyne RD Instruments; Sep. 4, 2008.

Llort-Pujol et al.; *Advanced interferometric techniques for high-resolution bathymetry*; Journal of Marine Technology Society; Mar. 1, 2012; vol. 46, No. 2; pp. 1-27.

Sărăcin et al.; "*Interferometric Bathymetry—principles and utility*"; Oct. 8, 2013; 1st European Conference of Geodesy and Geomatics Engineering; pp. 198-205.

Extended European Search Report for European Application No. EP16189168.4 dated Jan. 31, 2017.

Synnevag et al., "A low complexity data-dependent beamformer:", Ultrasonics Symposium 2008, Nov. 2, 2008, pp. 1084-1087.

Synnevag et al., "A low complexity data-dependent beamformer:", IEEE Transactions on Ultrasonics Ferroelectrics and Frequency Control, vol. 58, No. 2, Feb. 1, 2011, pp. 281-289.

Blomberg et al., "Improving Sonar Performance in Shallow Water Using Adaptive Beamforming", IEEE Journal of Oceanic Engineering, vol. 38, No. 2, Apr. 1, 2013, pp. 297-307.

U.S. Appl. No. 14/857,337, filed Sep. 17, 2015; In re: Horner; entitled *Adaptive Beamformer for Sonar Imaging*.

International Search Report and Written Opinion for International Application No. PCT/US2013/048177 dated Oct. 21, 2013.

International Search Report and Written Opinion for International Application No. PCT/US2013/048129 dated Oct. 17, 2013.

* cited by examiner

SONAR SYSTEMS AND METHODS USING INTERFEROMETRY AND/OR BEAMFORMING FOR 3D IMAGING

FIELD OF THE INVENTION

Embodiments of the present invention relate generally to sonar systems and, more particularly, to sonar systems, assemblies, and associated methods that use interferometry and/or beamforming for producing a 3D image or one or more 2D images of an underwater environment.

BACKGROUND OF THE INVENTION

Sonar (SOund Navigation And Ranging) has long been used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater. Sonar transducer elements, or simply transducers, may convert electrical energy into sound or vibrations at a particular frequency. A sonar sound beam is transmitted into and through the water and is reflected from objects it encounters. The transducer may receive the reflected sound (the "sonar returns") and convert the sound energy into electrical energy. Based on the known speed of sound, it is possible to determine the distance to and/or location of the waterborne or underwater objects. The sonar return signals can also be processed to be displayed in graphical form on a display device, giving the user a "picture" or image of the underwater environment. The signal processor and display may be part of a unit known as a "sonar head" that is connected by a wire to the transducer mounted remotely from the sonar head. Alternatively, the sonar transducer may be an accessory for an integrated marine electronics system offering other features such as GPS, radar, etc.

Traditionally, sonar systems transmit sonar signals into an underwater environment and receive sonar returns that are reflected off objects in the underwater environment (e.g., fish, structure, sea floor bottom, etc.). Applicant has identified a number of deficiencies and problems associated with conventional sonar systems and other associated systems. Through applied effort, ingenuity, and innovation, many of these identified problems have been solved by developing solutions that are included in embodiments of the present invention, many examples of which are described in detail herein.

BRIEF SUMMARY OF THE INVENTION

As detailed herein, sonar systems, transducer assemblies, and associated methods for imaging an underwater environment are provided. The sonar system may include a housing having a transducer array defining first and second rows of transducer elements positioned at a predetermined distance from one another. Each of the rows of transducer elements may include two or more transducer elements configured to convert sound energy into sonar return data. In some embodiments, a transmit transducer may transmit sonar pulses into the underwater environment. Each of the rows of transducer elements may receive sonar returns from the transmitted sonar pulses and use beamforming to generate a plurality of receive beams. In some embodiments, within each receive beam, interferometry may be used between the rows to generate an angle to the sonar returns. The combined angles generated by the interferometric process and the angle of each generated receive beam may be used to position and display sonar returns in three dimensions.

In some embodiments, a sonar system for imaging an underwater environment may be provided. The sonar system may include a housing mountable to a watercraft. The sonar system may include a transducer array within the housing and aimed at least partially downwardly from the watercraft. The transducer array may define a first row of transducer elements and a second row of transducer elements. The first row of transducer elements may comprise at least a first transducer element and a second transducer element. The first transducer element may be configured to receive first sonar returns from sonar pulses transmitted into the underwater environment and convert sound energy of the first sonar returns into first sonar return data. The second transducer element may be configured to receive second sonar returns from the sonar pulses transmitted into the underwater environment and convert sound energy of the second sonar returns into second sonar return data. The second row of transducer elements may comprise at least a third transducer element and a fourth transducer element. The third transducer element may be configured to receive third sonar returns from the sonar pulses transmitted into the underwater environment and convert sound energy of the third sonar returns into third sonar return data. The fourth transducer element may be configured to receive fourth sonar returns from the sonar pulses transmitted into the underwater environment and convert sound energy of the fourth sonar returns into fourth sonar return data. The first row of transducer elements may be disposed proximate the second row of transducer elements such that the first transducer element may be positioned in the housing at a predetermined distance from the third transducer element and the second transducer element may be positioned in the housing at the predetermined distance from the fourth transducer element. In some embodiments, the sonar system may further include a sonar signal processor configured to process the first sonar return data and the second sonar return data to generate a plurality of first array sonar return data that correspond to a plurality of first receive beams that are each oriented at different predetermined angles with respect to each other. The sonar signal processor may be configured to process the third sonar return data and the fourth sonar return data to generate a plurality of second array sonar return data that correspond to a plurality of second receive beams that are each oriented at the different predetermined angles with respect to each other. In some embodiments, the sonar signal processor may be configured to generate, based on the first sonar return data, the second sonar return data, the third sonar return data, and the fourth sonar return data, a set of 3D sonar return data associated with the underwater environment by: generating one or more second angles within each of the plurality of first receive beams by correlating the plurality of first array sonar return data and the plurality of second array sonar return data at each of the different predetermined angles. The correlation may be based on the predetermined distance, and wherein the second angle may be perpendicular to the different predetermined angle of each corresponding first receive beam. The sonar system may further be configured to generate a 3D image based on the generated set of 3D sonar return data.

In some embodiments, the predetermined distance may be a first predetermined distance. The transducer array may further comprise a third row of transducer elements including at least a fifth transducer element and a sixth transducer element. The fifth transducer element may be configured to receive fifth sonar returns from the sonar pulses transmitted into the underwater environment and convert sound energy of the fifth sonar returns into fifth sonar return data. The sixth transducer element may be configured to receive sixth sonar returns from the sonar pulses transmitted into the underwater environment and convert sound energy of the sixth sonar returns into sixth sonar return data. The third row of transducer elements may be disposed adjacent the second row of transducer elements, such that the fifth transducer element may be positioned in the housing at a second predetermined distance from the third transducer element and the sixth transducer element may be positioned in the housing at the second predetermined distance from the fourth transducer element. In some embodiments, the sonar signal processor may be further configured to process the fifth sonar return data and the sixth sonar return data to generate a plurality of third array sonar return data that correspond to a plurality of third receive beams that are each oriented at the different predetermined angles with respect to each other. The sonar signal processor may be further configured to generate the second angle within each of the plurality of first receive beams based on a correlation among the plurality of first array sonar return data, the plurality of second array sonar return data, and the plurality of third array sonar return data. In some embodiments, the first predetermined distance may be different than the second predetermined distance. In some further embodiments, the first predetermined distance may be half the second predetermined distance. The fifth transducer element may be positioned in the housing at a third predetermined distance from the first transducer element and the sixth transducer element may be positioned in the housing at the third predetermined distance from the second transducer element.

In some embodiments, first row and the second row may be oriented horizontally, such that a first axis spanning the first transducer element and the second transducer element and a second axis spanning the third transducer element and the fourth transducer element may be configured to be disposed perpendicular to a centerline of the watercraft.

In some embodiments, the first row and the second row may be oriented at least partially vertically, such that at least a component of a first axis spanning the first transducer element and the second transducer element and at least a component of a second axis spanning the third transducer element and the fourth transducer element may be configured to be disposed parallel to a centerline of the watercraft.

In some embodiments, the first row of transducer elements may further comprise a fifth transducer element configured to receive fifth sonar returns from the sonar pulses transmitted into the underwater environment and convert sound energy of the fifth sonar returns into fifth sonar return data. The second row of transducer elements may further comprise a sixth transducer element configured to receive sixth sonar returns from the sonar pulses transmitted into the underwater environment and convert sound energy of the sixth sonar returns into sixth sonar return data. The sonar signal processor may be further configured to process the fifth sonar return data with the first sonar return data and the second sonar return data to generate the plurality of first array sonar return data, and the sonar signal processor may be further configured to process the sixth sonar return data with the third sonar return data and the fourth sonar return data to generate the plurality of second array sonar return data.

In some embodiments, each of the first row of transducer elements and the second row of transducer elements may include more transducer elements than a number of rows of transducer elements.

In some embodiments, the first transducer element may be formed of a plurality of transducer elements electrically connected to act as the first transducer element.

The transducer array may define a substantially planar shape, such that each of the first transducer element, the second transducer element, the third transducer element, and the fourth transducer element may be arranged on a plane.

The transducer array may define a receiving surface that may correspond to a receiving surface of the first transducer element, a receiving surface of the second transducer element, a receiving surface of the third transducer element, and a receiving surface of the fourth transducer element. The receiving surface may be curved such that the receiving surface of the first transducer element and the receiving surface of the third transducer element may be configured to define different angles with respect to the surface of the body of water. In some embodiments, the receiving surface of the first transducer element and the receiving surface of the second transducer element define a same angle with respect to the surface of the body of water.

In some embodiments, the transducer array may define a receiving surface that corresponds to a receiving surface of the first transducer element, a receiving surface of the second transducer element, a receiving surface of the third transducer element, and a receiving surface of the fourth transducer element, the receiving surface may be curved such that the receiving surface of the first transducer element and the receiving surface of the second transducer element are configured to define different angles with respect to the surface of the body of water. In some embodiments, the receiving surface of the first transducer element and the receiving surface of the second transducer element define a same angle with respect to the surface of the body of water.

The transducer array may define a receiving surface, and the receiving surface may be configured to be oriented downwardly and forwardly from the watercraft.

In some embodiments, the transducer array may define a receiving surface, and the receiving surface may be configured to be oriented downwardly from the watercraft such that the receiving surface may be configured to be oriented substantially perpendicular to the surface of the body of water.

In some other embodiments, transducer assembly for imaging an underwater environment may be provided. The transducer assembly may include a housing mountable to a watercraft. In some embodiments, the transducer assembly may include a transducer array within the housing and aimed at least partially downwardly from the watercraft. The transducer array may define a first row of transducer elements and a second row of transducer elements. The first row of transducer elements may comprise at least a first transducer element and a second transducer element. The first transducer element may be configured to receive first sonar returns from sonar pulses transmitted into the underwater environment and convert sound energy of the first sonar returns into first sonar return data. The second transducer element may be configured to receive second sonar returns from the sonar pulses transmitted into the underwater environment and convert sound energy of the second sonar returns into second sonar return data. The second row of transducer elements may comprise at least a third transducer element and a fourth transducer element. The third transducer element may be configured to receive third sonar returns from the sonar pulses transmitted into the underwater environment and convert sound energy of the third sonar returns into third sonar return data. The fourth transducer element may be configured to receive fourth sonar returns from the sonar pulses transmitted into the underwater environment and convert sound energy of the fourth sonar returns into fourth sonar return data. The first row of transducer elements may be disposed proximate the second row of transducer elements such that the first transducer element may be positioned in the housing at a predetermined distance from the third transducer element and the second transducer element may be positioned in the housing at the predetermined distance from the fourth transducer element. The first and second transducer elements may be configured to transmit the first sonar return data and the second sonar return data, respectively, to a sonar signal processor to generate a plurality of first array sonar return data that may correspond to a plurality of first receive beams that may each be oriented at different predetermined angles with respect to each other. The third and fourth transducer elements may be configured to transmit the third sonar return data and the fourth sonar return data, respectively, to the sonar signal processor to generate a plurality of second array sonar return data that may correspond to a plurality of second receive beams that may each be oriented at the different predetermined angles with respect to each other. In some embodiments, the first, second, third, and fourth transducer elements may be configured to transmit the first sonar return data, the second sonar return data, the third sonar return data, and the fourth sonar return data, respectively, to the sonar signal processor to be processed to generate a set of 3D sonar return data associated with the underwater environment by generating one or more second angles within each of the plurality of first receive beams by correlating the plurality of first array sonar return data and the plurality of second array sonar return data at each of the different predetermined angles, wherein the correlation may be based on the predetermined distance, and the second angle may be perpendicular to the different predetermined angle of each corresponding first receive beam. The first, second, third, and fourth transducer elements may be configured to transmit the first sonar return data, the second sonar return data, the third sonar return data, and the fourth sonar return data, respectively, to the sonar signal processor to generate a 3D image based on the generated set of 3D sonar return data.

In some embodiments, the predetermined distance may be a first predetermined distance. The transducer array may further comprise a third row of transducer elements that comprises at least a fifth transducer element and a sixth transducer element. The fifth transducer element may be configured to receive fifth sonar returns from the sonar pulses transmitted into the underwater environment and convert sound energy of the fifth sonar returns into fifth sonar return data. The sixth transducer element may be configured to receive sixth sonar returns from the sonar pulses transmitted into the underwater environment and convert sound energy of the sixth sonar returns into sixth sonar return data. The third row of transducer elements may be disposed adjacent the second row of transducer elements, such that the fifth transducer element may be positioned in the housing at a second predetermined distance from the third transducer element and the sixth transducer element may be positioned in the housing at the second predetermined distance from the fourth transducer element. The fifth and sixth transducer elements may be configured to transmit the fifth sonar return data and the sixth sonar return data, respectively, to the sonar signal processor to process the fifth sonar return data and the sixth sonar return data to generate a plurality of third array sonar return data that correspond to a plurality of third receive beams that are each oriented at the different predetermined angles with respect to each other. The second angle within each of the plurality of first receive beams may be based on a correlation among the plurality of first array sonar return data, the plurality of second array sonar return data, and the plurality of third array sonar return data. In some embodiments, the first predetermined distance may be different than the second predetermined distance. In some further embodiments, the first predetermined distance may be half the second predetermined distance. In some embodiments, the fifth transducer element may be positioned in the housing at a third predetermined distance from the first transducer element and the sixth transducer element may be positioned in the housing at the third predetermined distance from the second transducer element.

The first row and the second row may be oriented horizontally, such that a first axis spanning the first transducer element and the second transducer element and a second axis spanning the third transducer element and the fourth transducer element may be configured to be disposed perpendicular to a centerline of the watercraft.

In some embodiments, the first row and the second row may be oriented at least partially vertically, such that at least a component of a first axis spanning the first transducer element and the second transducer element and at least a component of a second axis spanning the third transducer element and the fourth transducer element may be configured to be disposed parallel to a centerline of the watercraft.

The first row of transducer elements may further comprise a fifth transducer element configured to receive fifth sonar returns from the sonar pulses transmitted into the underwater environment and convert sound energy of the fifth sonar returns into fifth sonar return data. The second row of transducer elements may further comprise a sixth transducer element configured to receive sixth sonar returns from the sonar pulses transmitted into the underwater environment and convert sound energy of the sixth sonar returns into sixth sonar return data. The fifth transducer element may be configured to transmit the fifth sonar data to the sonar signal processor to process the fifth sonar return data with the first sonar return data and the second sonar return data to generate the plurality of first array sonar return data. The sixth transducer element may be configured to transmit the sixth sonar data to the sonar signal processor to process the sixth sonar return data with the third sonar return data and the fourth sonar return data to generate the plurality of second array sonar return data.

In some embodiments, each of the first row of transducer elements and the second row of transducer elements may include more transducer elements than a number of rows of transducer elements.

In some embodiments, the first transducer element may be formed of a plurality of transducer elements electrically connected to act as the first transducer element.

The transducer array may define a substantially planar shape, such that each of the first transducer element, the second transducer element, the third transducer element, and the fourth transducer element may be arranged on a plane.

The transducer array may define a receiving surface that may correspond to a receiving surface of the first transducer element, a receiving surface of the second transducer element, a receiving surface of the third transducer element, and a receiving surface of the fourth transducer element. The receiving surface may be curved such that the receiving surface of the first transducer element and the receiving surface of the third transducer element may be configured to define different angles with respect to the surface of the body of water. The receiving surface of the first transducer element and the receiving surface of the second transducer element may define a same angle with respect to the surface of the body of water.

The transducer array may define a receiving surface that corresponds to a receiving surface of the first transducer element, a receiving surface of the second transducer element, a receiving surface of the third transducer element, and a receiving surface of the fourth transducer element. The receiving surface may be curved such that the receiving surface of the first transducer element and the receiving surface of the second transducer element may be configured to define different angles with respect to the surface of the body of water. The receiving surface of the first transducer element and the receiving surface of the second transducer element may define a same angle with respect to the surface of the body of water.

The transducer array may define a receiving surface, and the receiving surface may be configured to be oriented downwardly and forwardly from the watercraft.

The transducer array may define a receiving surface, and the receiving surface may be configured to be oriented downwardly from the watercraft such that the receiving surface may be configured to be oriented substantially perpendicular to the surface of the body of water.

In yet another embodiment, a method of imaging an underwater environment may be provided. The method may include transmitting sonar pulses into a body of water from a housing mountable to a watercraft. The method may include receiving, via a first transducer element of a first row of transducer elements in a transducer array, first sonar returns from sonar pulses transmitted into the water. The transducer array may be positioned within the housing and configured to be aimed at least partially downwardly from the watercraft. The first transducer element may be configured to convert sound energy of the first sonar returns into first sonar return data. The method may further include receiving, via a second transducer element of the first row of transducer elements in the transducer array, second sonar returns from the sonar pulses transmitted into the underwater environment. The second transducer element may be configured to convert sound energy of the second sonar returns into second sonar return data. The method may include receiving, via a third transducer element of a second row of transducer elements in the transducer array, third sonar returns from the sonar pulses transmitted into the underwater environment. The third transducer element may be configured to convert sound energy of the third sonar returns into third sonar return data. The method may include receiving, via a fourth transducer element of the second row of transducer elements in the transducer array, fourth sonar returns from the sonar pulses transmitted into the underwater environment. The fourth transducer element may be configured to convert sound energy of the fourth sonar returns into fourth sonar return data. The first row of transducer elements may be disposed proximate the second row of transducer elements such that the first transducer element may be positioned in the housing at a predetermined distance from the third transducer element and the second transducer element may be positioned in the housing at the predetermined distance from the fourth transducer element. Embodiments of the method may include processing, via a sonar signal processor, the first sonar return data and the second sonar return data to generate a plurality of first array sonar return data that may correspond to a plurality of first receive beams that may each be oriented at different predetermined angles with respect to each other. The method may include processing the third sonar return data and the fourth sonar return data to generate a plurality of second array sonar return data that may correspond to a plurality of second receive beams that may each be oriented at the different predetermined angles with respect to each other. Embodiments of the method may include generating, based on the first sonar return data, the second sonar return data, the third sonar return data, and the fourth sonar return data, a set of 3D sonar return data associated with the underwater environment by generating one or more second angles within each of the plurality of first receive beams by correlating the plurality of first array sonar return data and the plurality of second array sonar return data at each of the different predetermined angles. The correlation may be based on the predetermined distance, and the second angle may be perpendicular to the different predetermined angle of each corresponding first receive beam. The method may further include generating a 3D image based on the generated set of 3D sonar return data.

In some embodiments, the predetermined distance may be a first predetermined distance. The method may further comprise receiving, via a fifth transducer element of a third row of transducer elements in the transducer array, fifth sonar returns from the sonar pulses transmitted into the underwater environment. The fifth transducer element may be configured to convert sound energy of the fifth sonar returns into fifth sonar return data. The method may include receiving, via a sixth transducer element of the third row of transducer elements in the transducer array, sixth sonar returns from the sonar pulses transmitted into the underwater environment. The sixth transducer element may be configured to convert sound energy of the sixth sonar returns into sixth sonar return data. The third row of transducer elements may be disposed adjacent the second row of transducer elements, such that the fifth transducer element may be positioned in the housing at a second predetermined distance from the third transducer element and the sixth transducer element may be positioned in the housing at the second predetermined distance from the fourth transducer element. The method may further include processing the fifth sonar return data and the sixth sonar return data to generate a plurality of third array sonar return data that may correspond to a plurality of third receive beams that may each be oriented at the different predetermined angles with respect to each other. The method may include determining the second angle within each of the plurality of first receive beams based on a correlation among the plurality of first array sonar return data, the plurality of second array sonar return data, and the plurality of third array sonar return data. The first predetermined distance may be different than the second predetermined distance. The first predetermined distance may be half the second predetermined distance. The fifth transducer element may be positioned in the housing at a third predetermined distance from the first transducer element and the sixth transducer element may be positioned in the housing at the third predetermined distance from the second transducer element.

In some embodiments, the first row and the second row may be oriented horizontally, such that a first axis spanning the first transducer element and the second transducer element and a second axis spanning the third transducer element and the fourth transducer element may be configured to be disposed perpendicular to a centerline of the watercraft.

In some embodiments, the first row and the second row may be oriented at least partially vertically, such that at least a component of a first axis spanning the first transducer element and the second transducer element and at least a component a second axis spanning the third transducer element and the fourth transducer element may be configured to be disposed parallel to a centerline of the watercraft.

Embodiments of the method may further include receiving, via a fifth transducer element of the first row of transducer elements in the transducer array, fifth sonar returns from the sonar pulses transmitted into the underwater environment. The fifth transducer element may be configured to convert sound energy of the fifth sonar returns into fifth sonar return data. The method may include receiving, via a sixth transducer element of the second row of transducer elements in the transducer array, sixth sonar returns from the sonar pulses transmitted into the underwater environment. The sixth transducer element may be configured to convert sound energy of the sixth sonar returns into sixth sonar return data. Embodiments of the method may include processing the fifth sonar return data with the first sonar return data and the second sonar return data to generate the plurality of first array sonar return data, and may include processing the sixth sonar return data with the third sonar return data and the fourth sonar return data to generate the plurality of second array sonar return data.

In some embodiments, each of the first row of transducer elements and the second row of transducer elements may include more transducer elements than a number of rows of transducer elements.

The first transducer element may be formed of a plurality of transducer elements electrically connected to act as the first transducer element.

The transducer array may define a substantially planar shape, such that each of the first transducer element, the second transducer element, the third transducer element, and the fourth transducer element may be arranged on a plane.

The transducer array may define a receiving surface that may corresponds to a receiving surface of the first transducer element, a receiving surface of the second transducer element, a receiving surface of the third transducer element, and a receiving surface of the fourth transducer element. The receiving surface may be curved such that the receiving surface of the first transducer element and the receiving surface of the third transducer element may be configured to define different angles with respect to the surface of the body of water. The receiving surface of the first transducer element and the receiving surface of the second transducer element may define a same angle with respect to the surface of the body of water.

In some embodiments, the transducer array may defines a receiving surface that may corresponds to a receiving surface of the first transducer element, a receiving surface of the second transducer element, a receiving surface of the third transducer element, and a receiving surface of the fourth transducer element. The receiving surface may be curved such that the receiving surface of the first transducer element and the receiving surface of the second transducer element may be configured to define different angles with respect to the surface of the body of water. The receiving surface of the first transducer element and the receiving surface of the second transducer element may define a same angle with respect to the surface of the body of water.

In some embodiments, the transducer array may define a receiving surface, and the receiving surface may be configured to be oriented downwardly and forwardly from the watercraft.

The transducer array may define a receiving surface, and the receiving surface may be configured to be oriented downwardly from the watercraft such that the receiving surface may be configured to be oriented substantially perpendicular to the surface of the body of water.

BRIEF DESCRIPTION OF THE DRAWINGS

Figure 1:
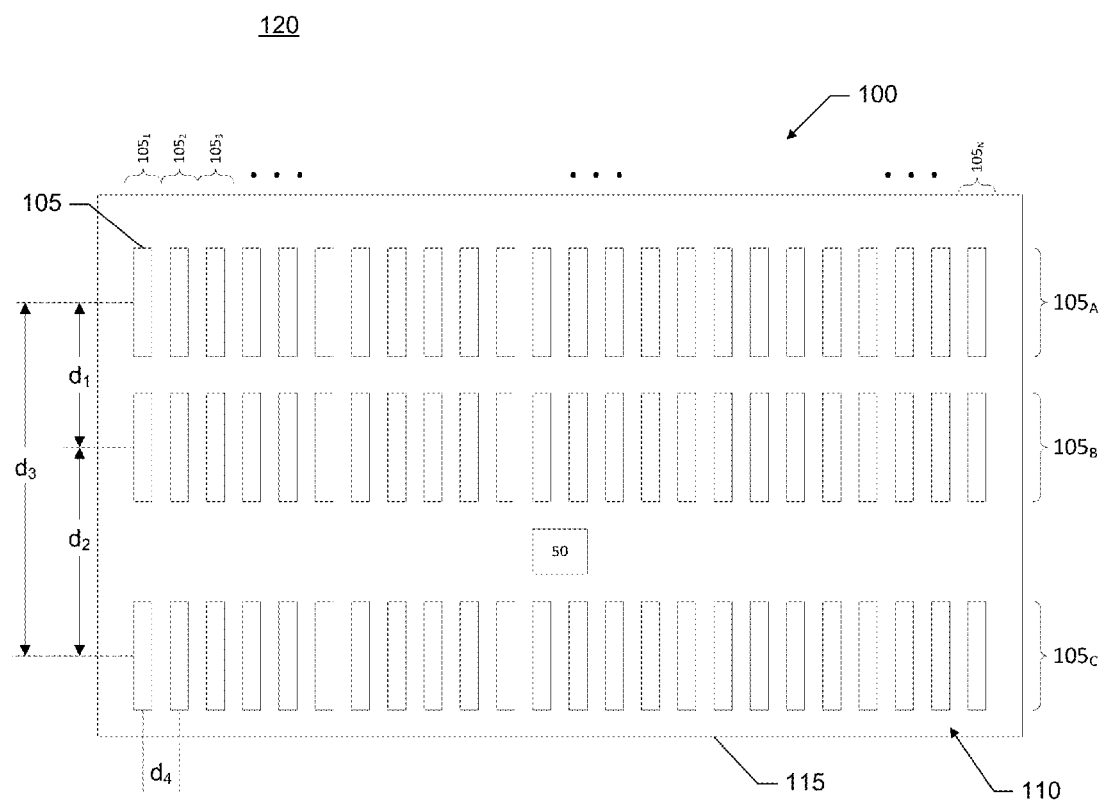
Figure 2:
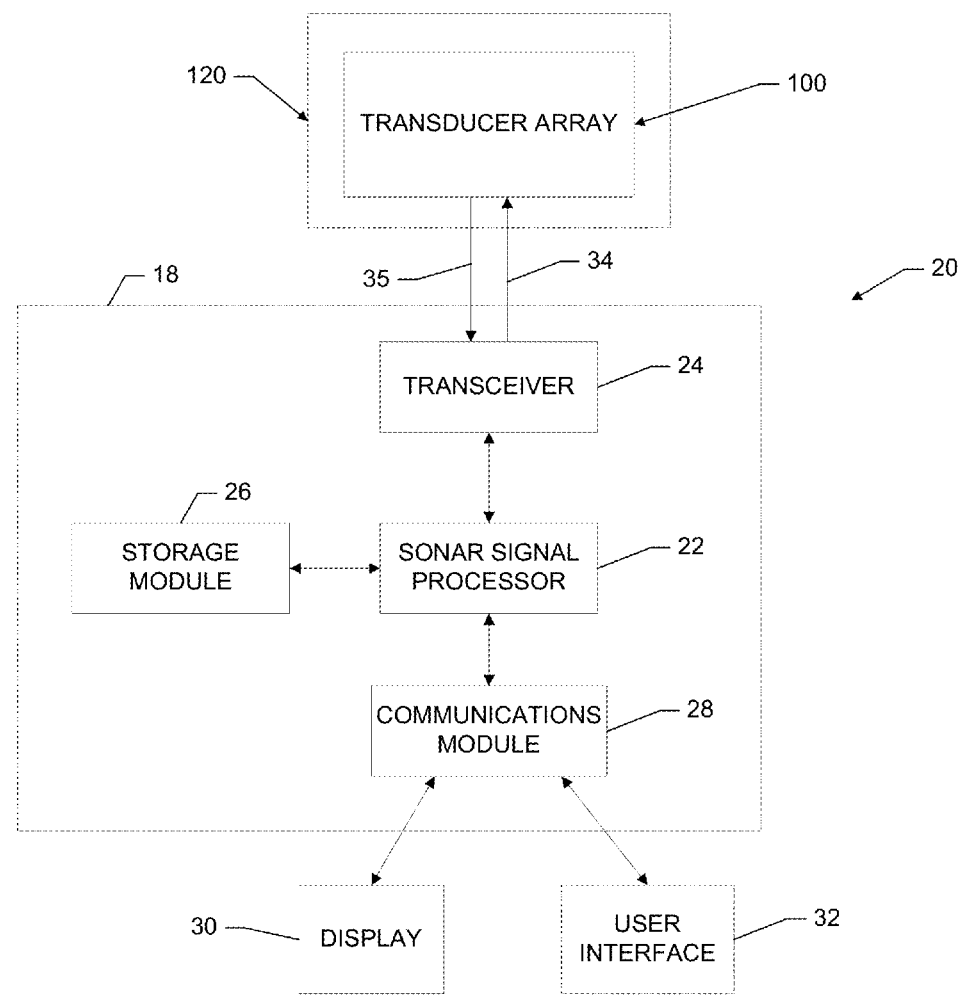
Figure 3:
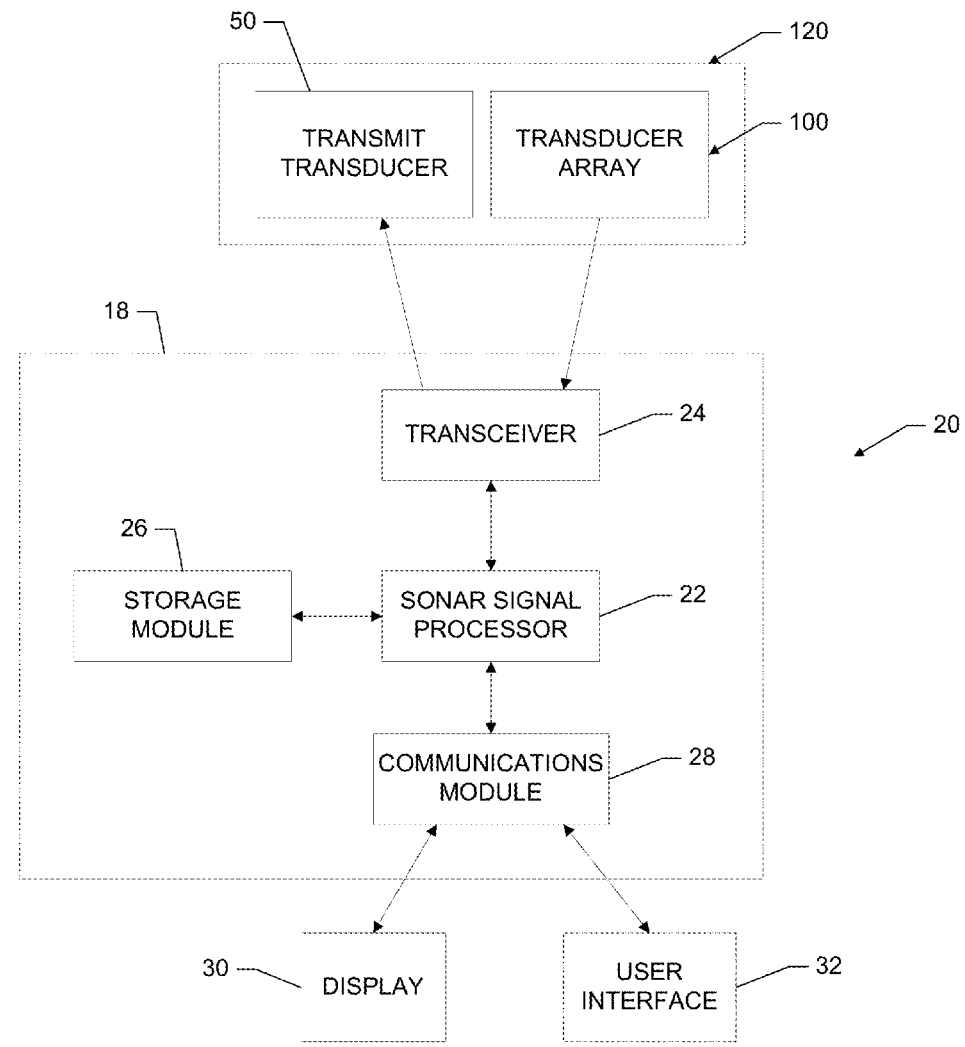
Figure 4:
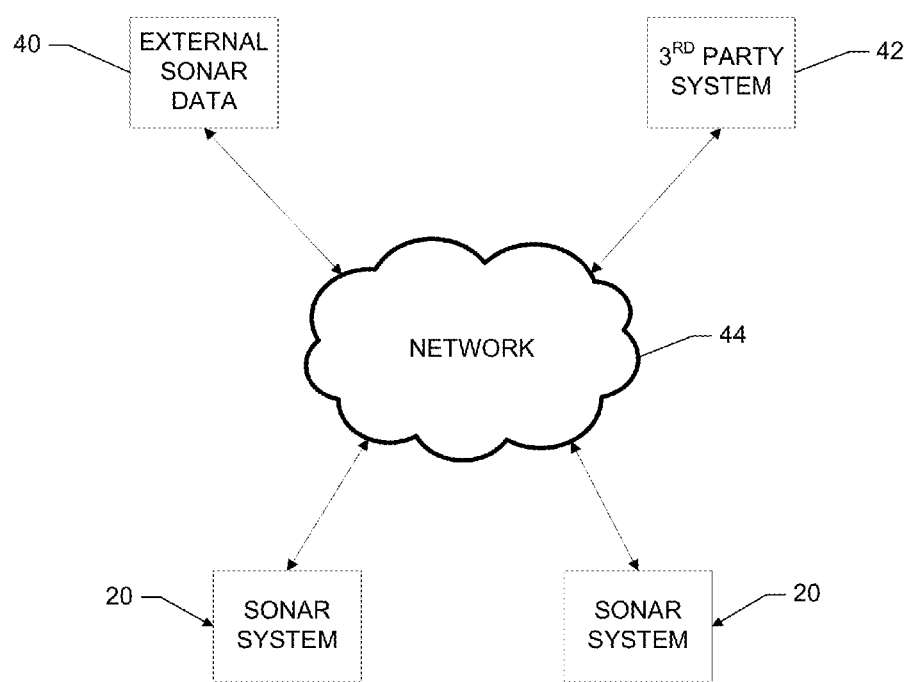
Figure 5:
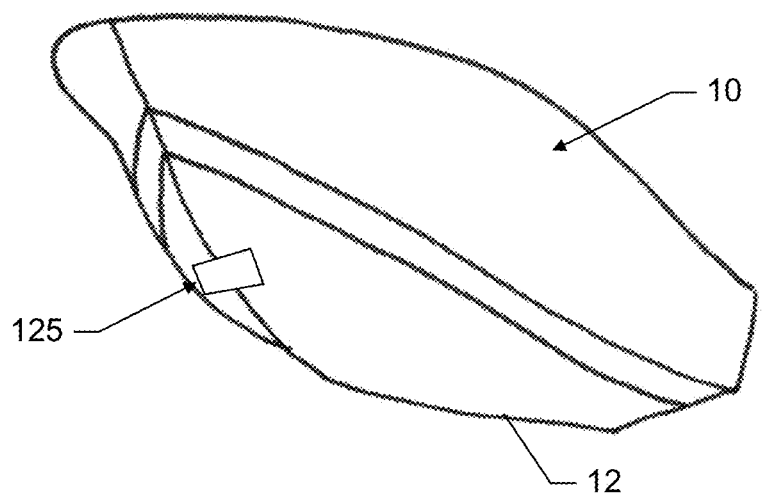
Figure 6:
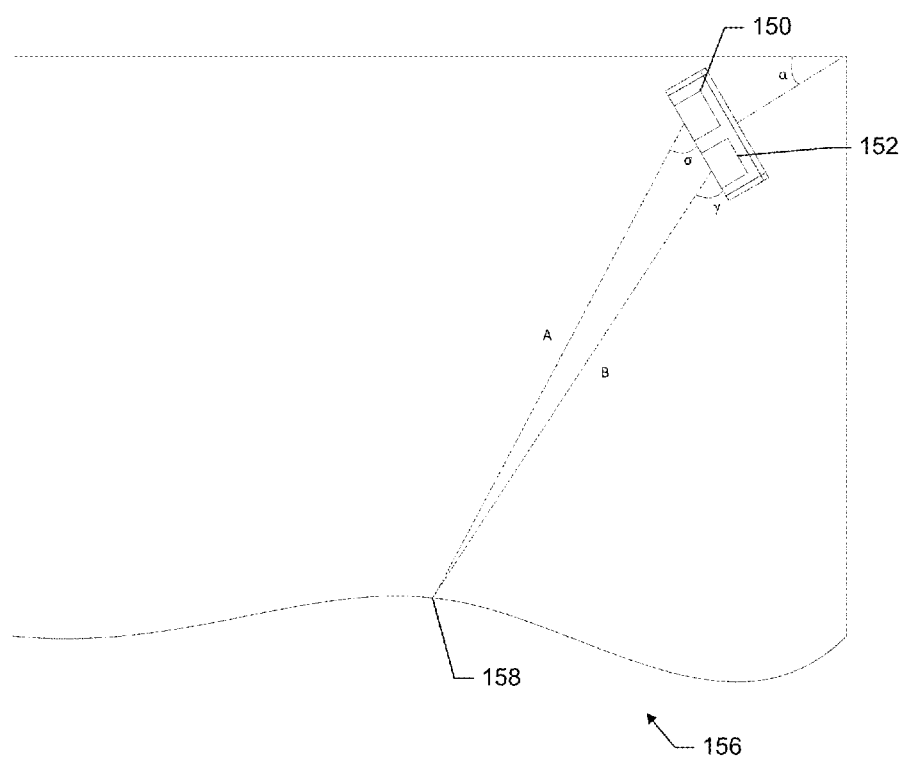
Figure 7:
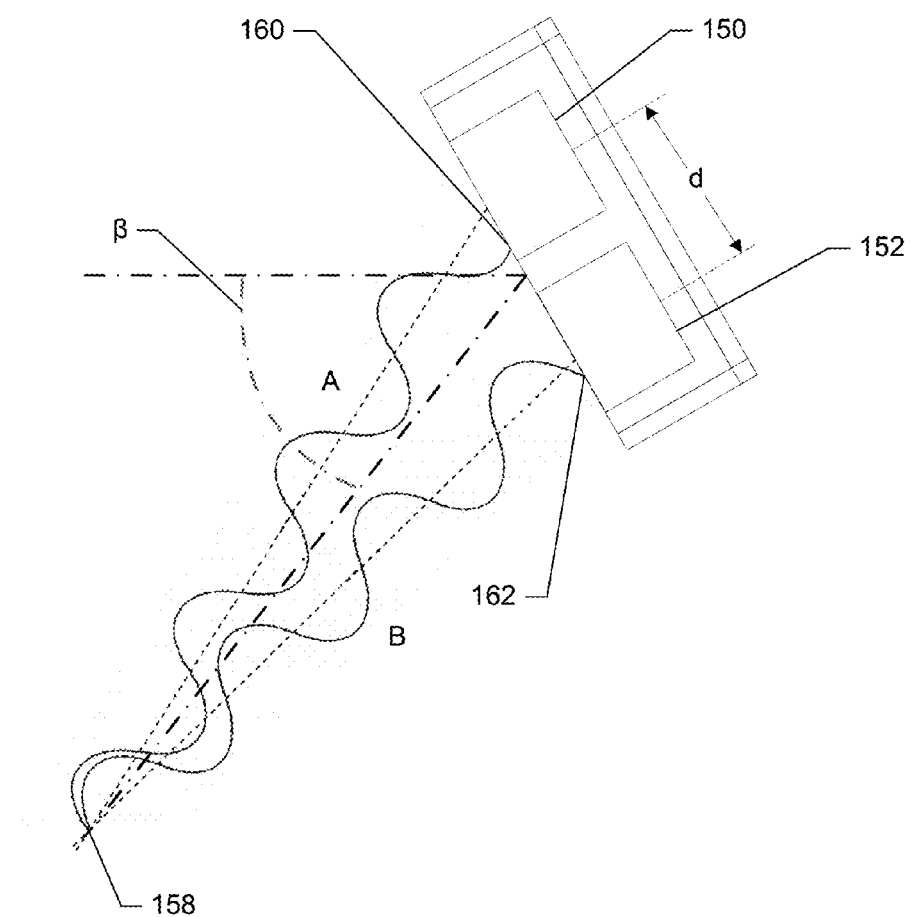
Figure 8:
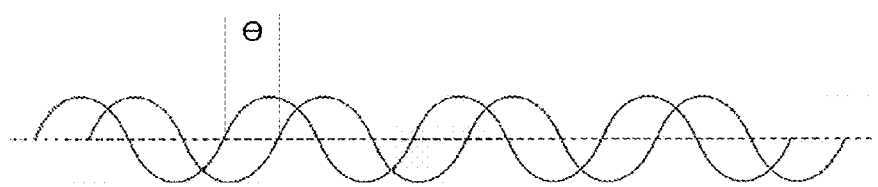
Figure 9:
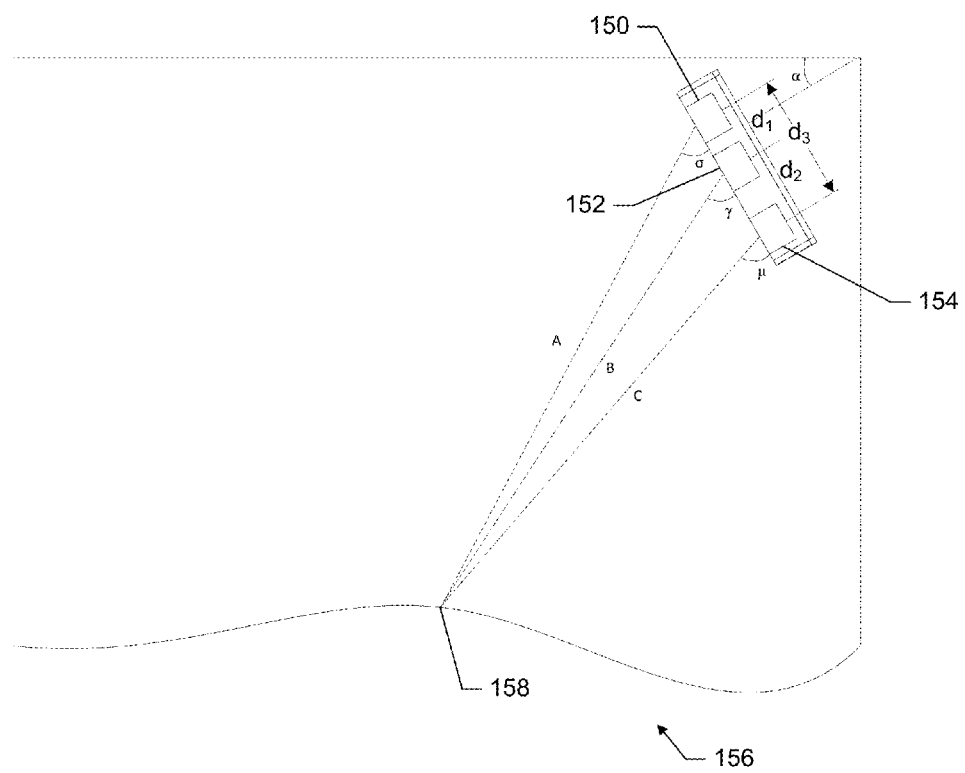
Figure 10:
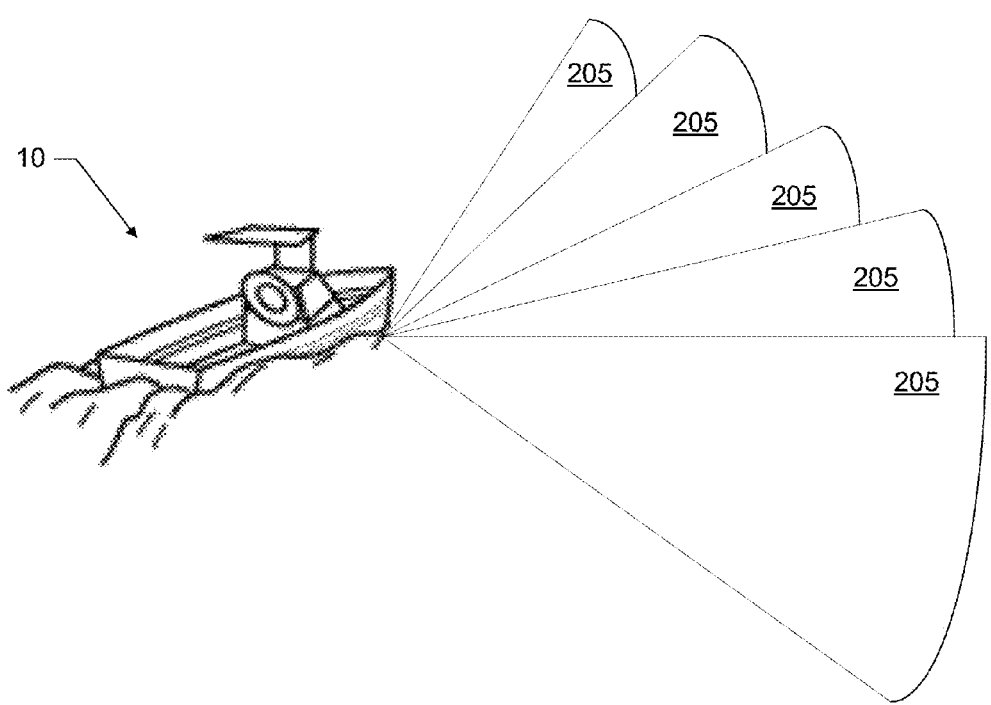
Figure 11:
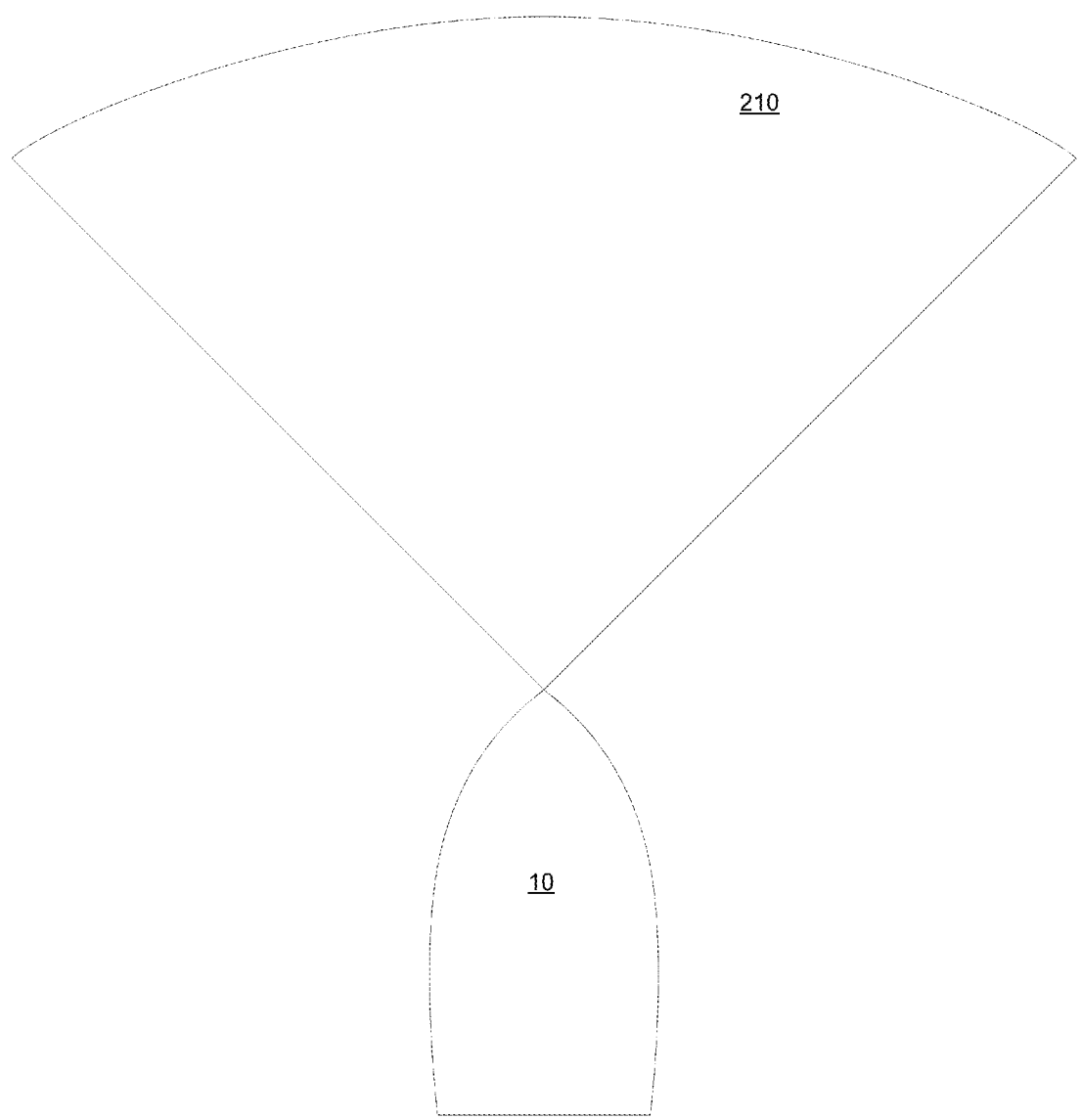
Figure 12:
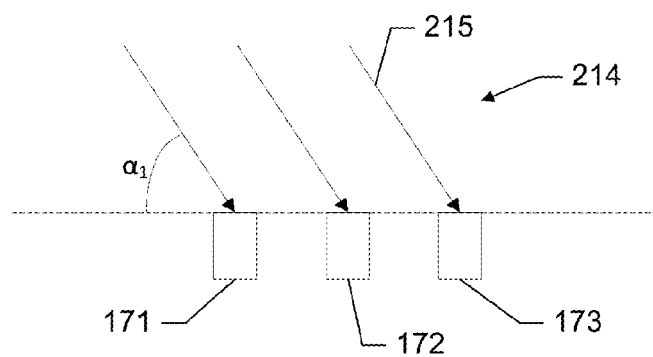
Figure 13:
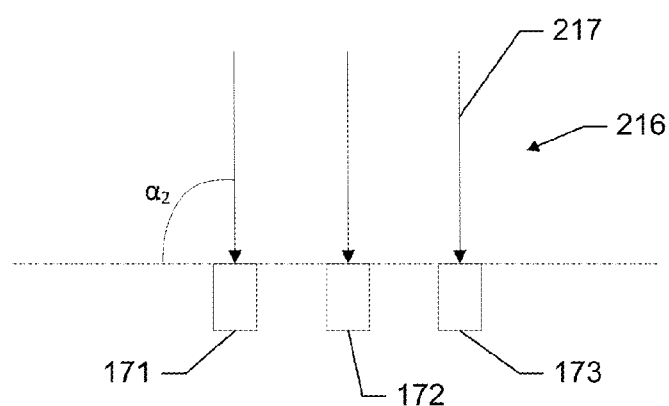
Figure 14:
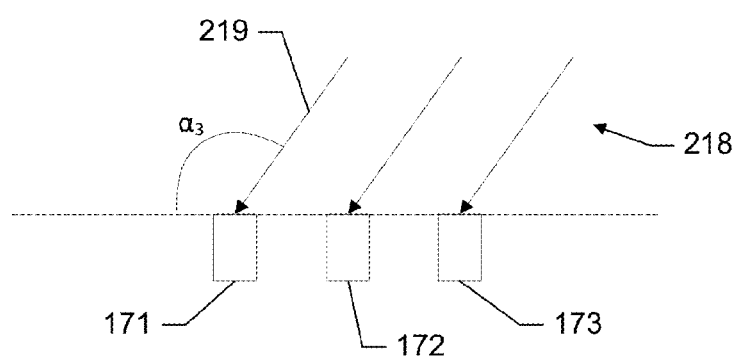
Figure 15:
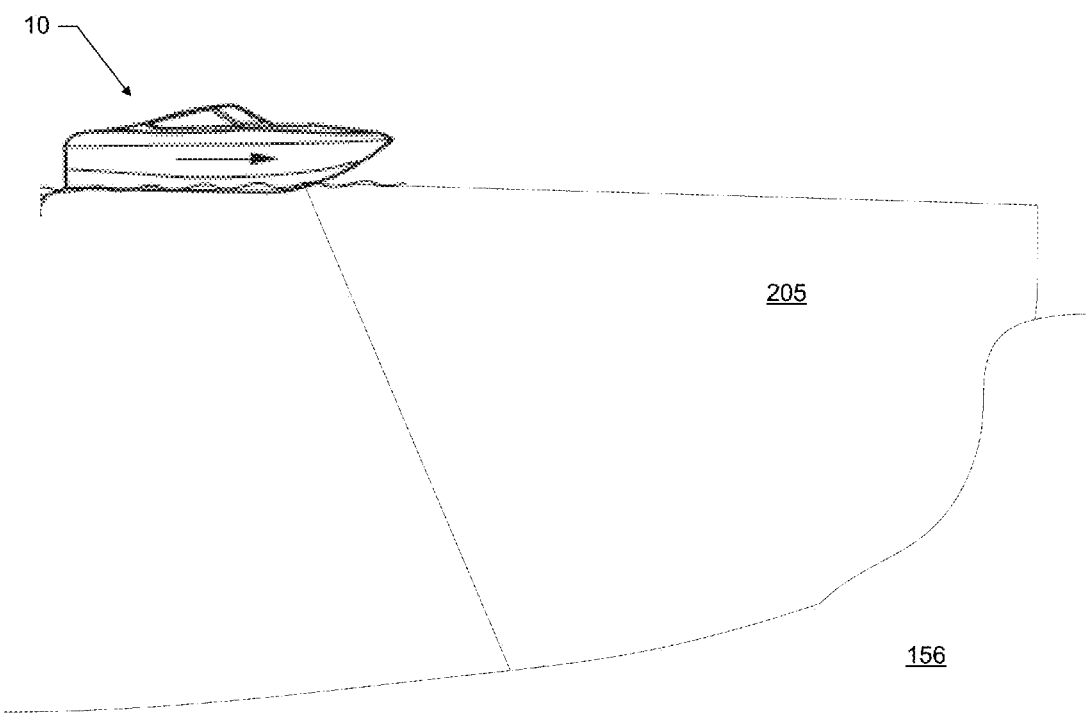
Figure 16:
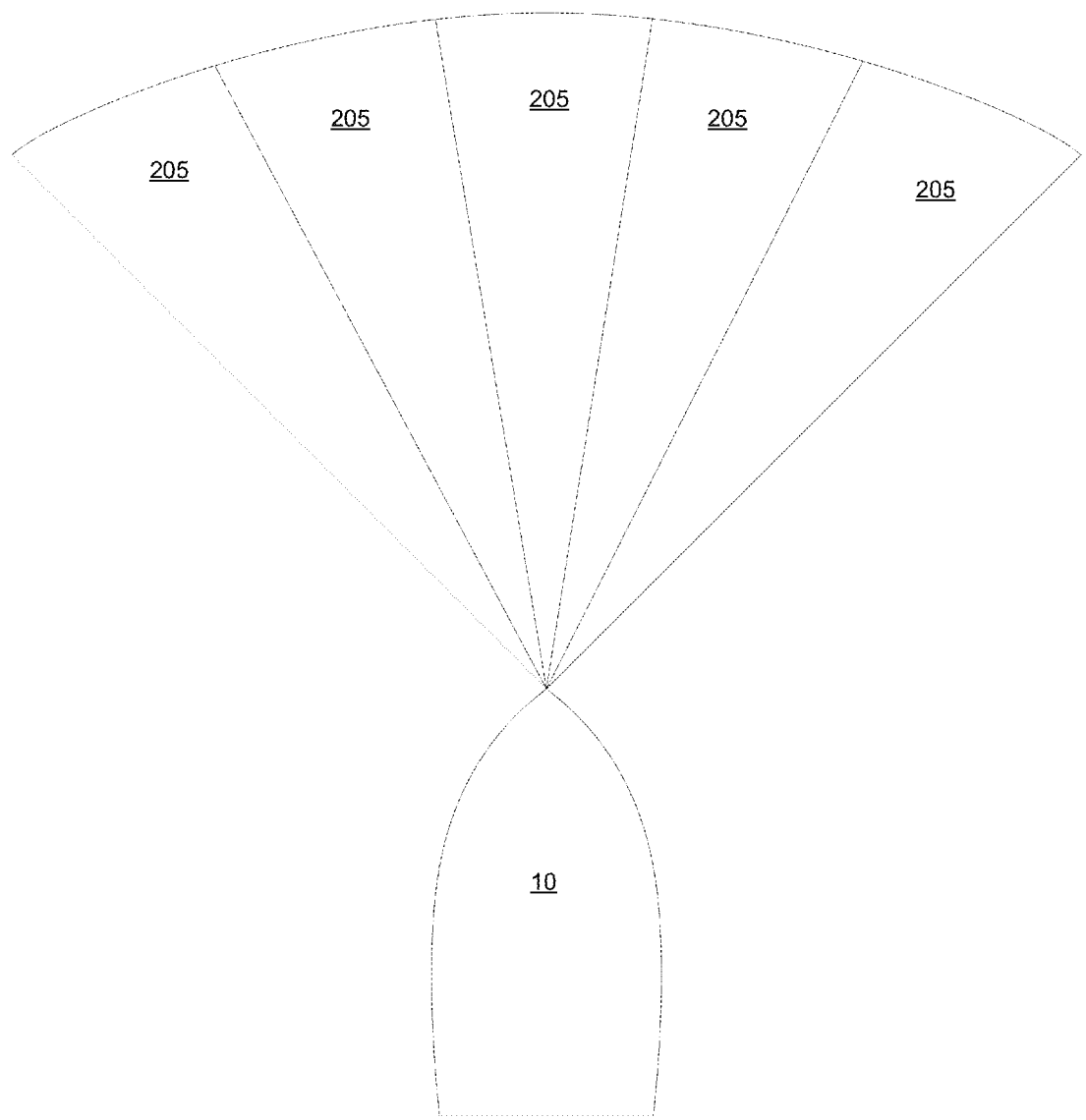
Figure 17:
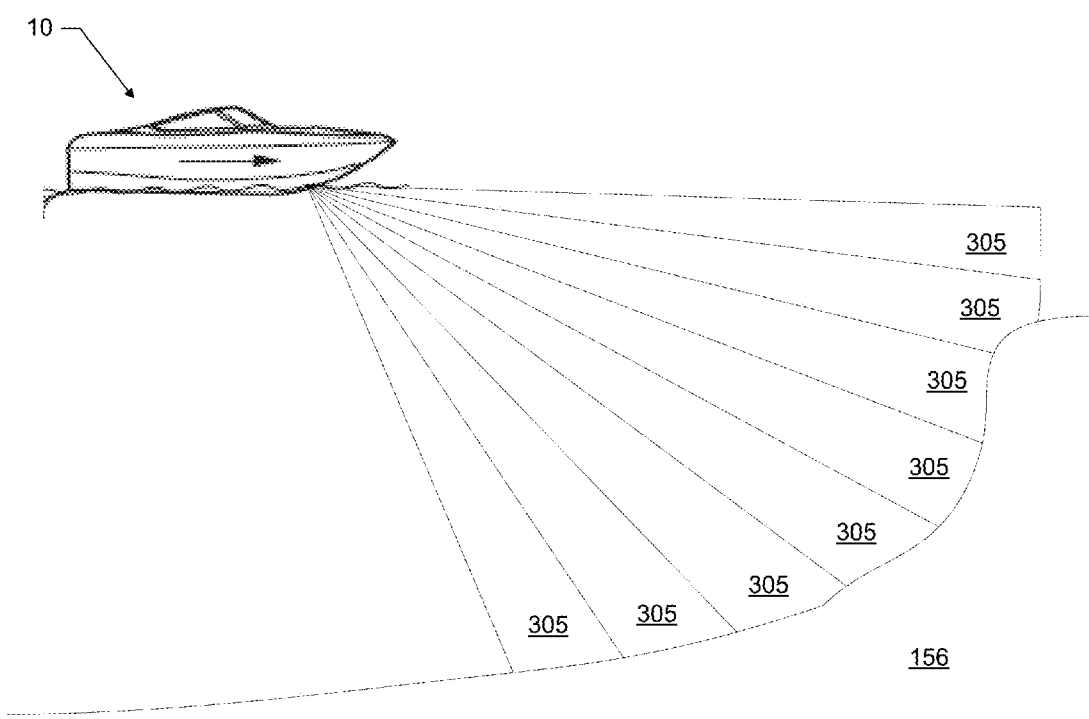
Figure 18:
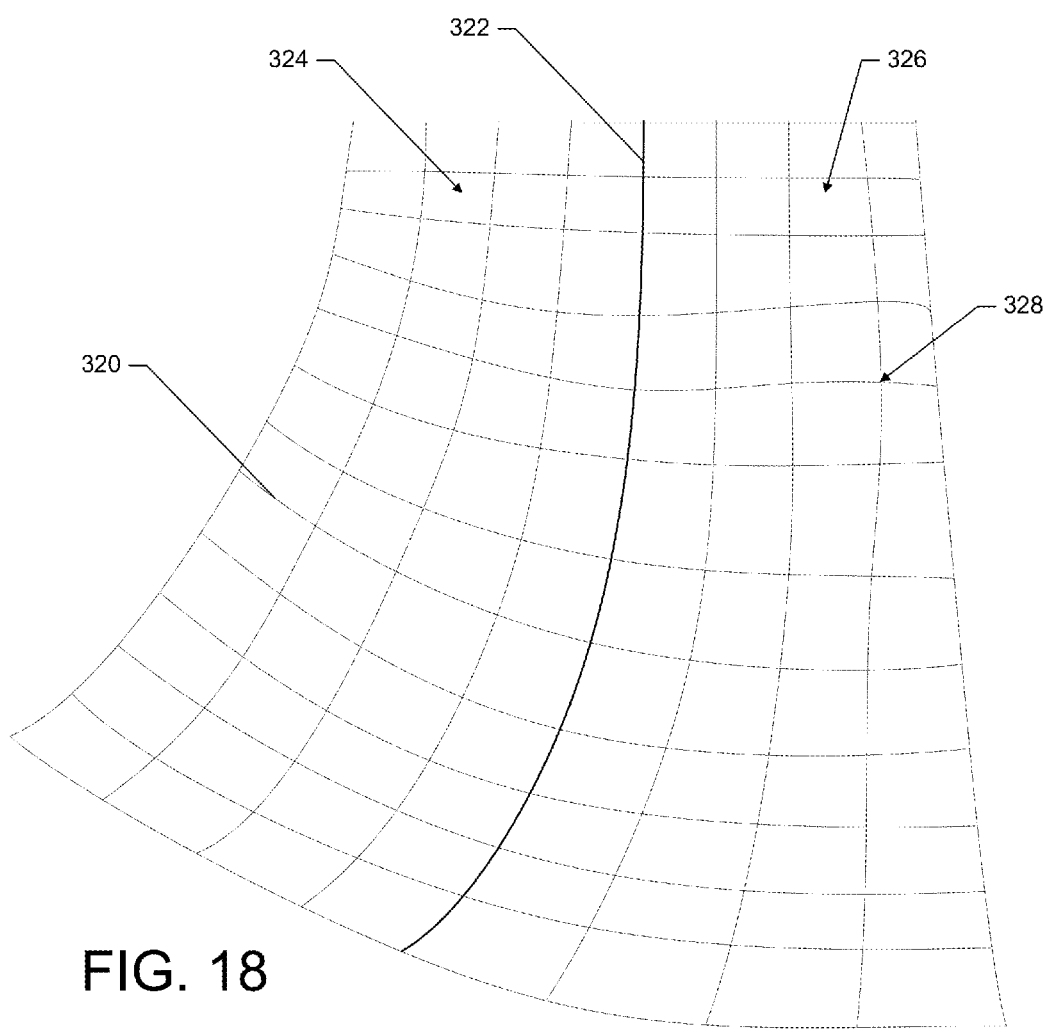
Figure 19:
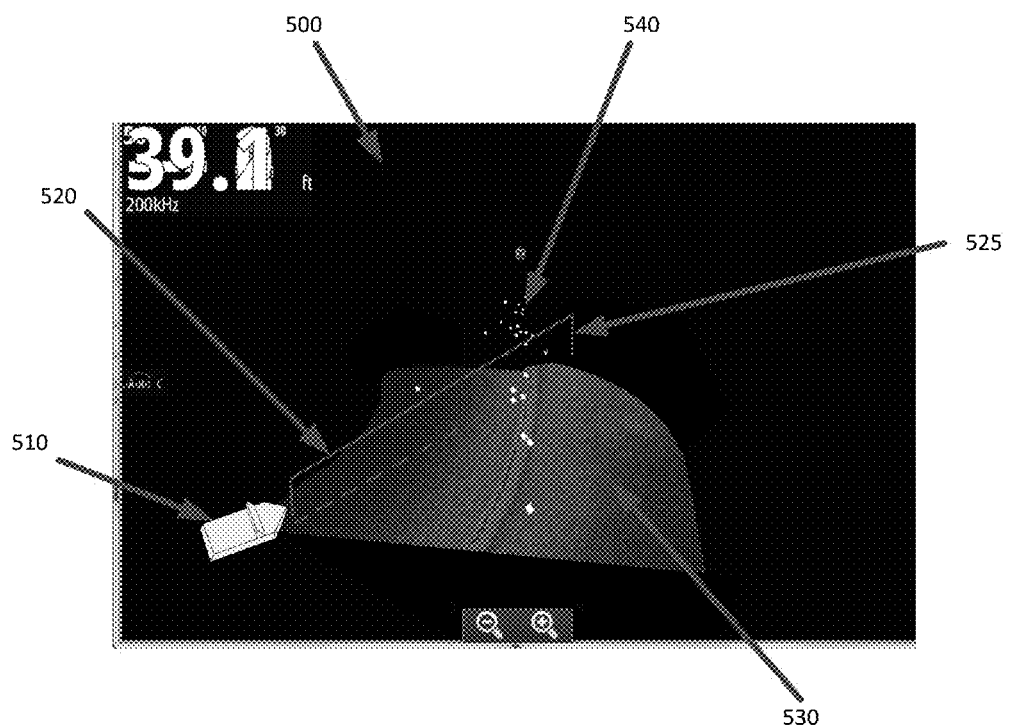
Figure 20:
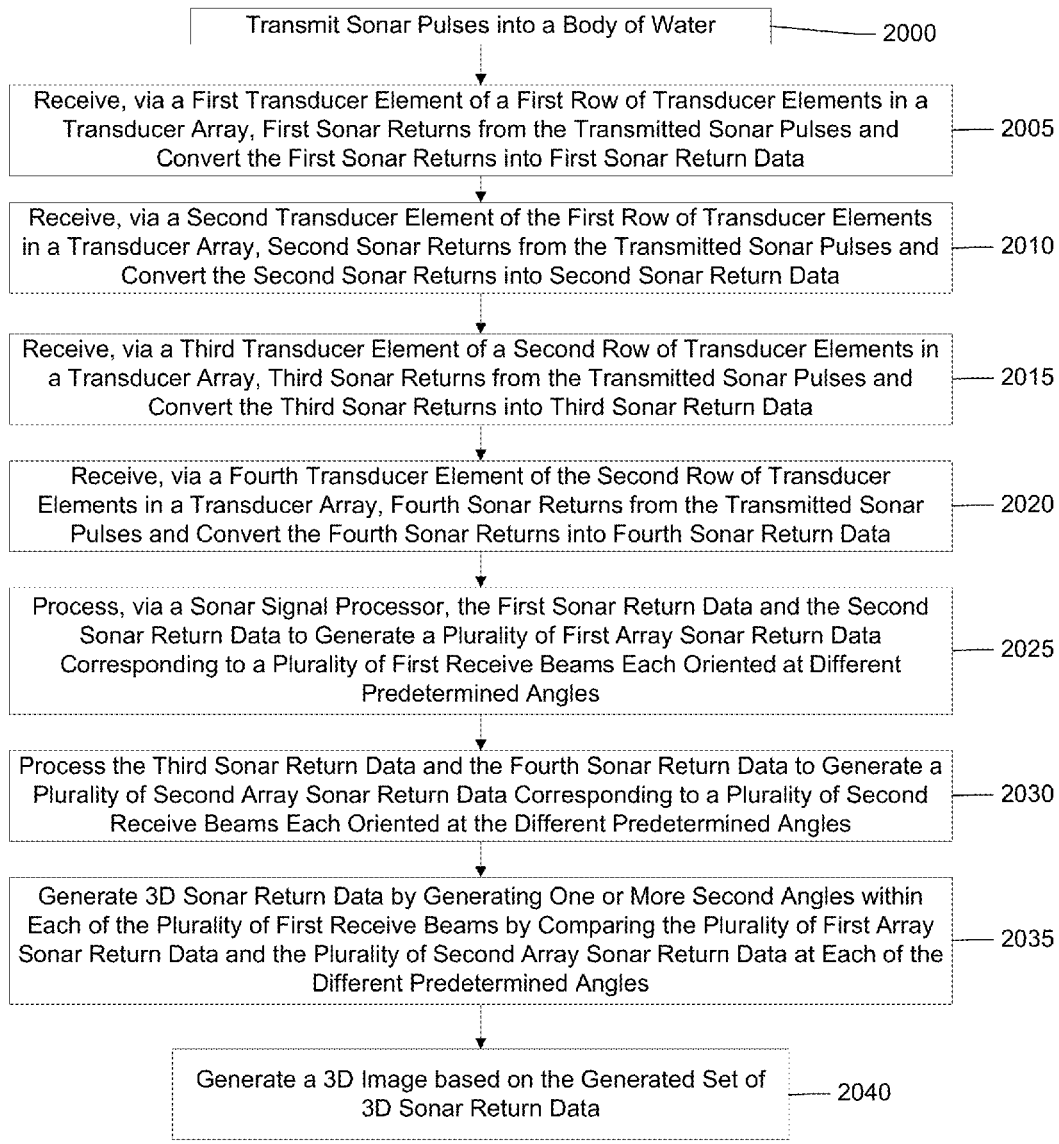

Having thus described the invention in general terms, reference will now be made to the accompanying drawings, which are not necessarily drawn to scale, and wherein:

FIG. 1 shows a transducer assembly having a transducer array in accordance with some embodiments discussed herein;

FIG. 2 shows a block diagram illustrating a sonar system in accordance with some embodiments discussed herein;

FIG. 3 shows another block diagram illustrating a sonar system in accordance with some embodiments discussed herein;

FIG. 4 shows a basic block diagram illustrating multiple sonar systems connected to a network in accordance with some embodiments discussed herein;

FIG. 5 shows a transducer housing mounted to a watercraft in accordance with some embodiments discussed herein;

FIG. 6 shows an example simplified transducer array receiving returns from a floor of a body of water according to some embodiments discussed herein;

FIG. 7 shows the transducer array of FIG. 6 having illustrated waves being received by the transducer elements in accordance with some embodiments discussed herein;

FIG. 8 shows a linear transposition of the two waves of FIG. 7 in accordance with some embodiments discussed herein;

FIG. 9 shows another example simplified transducer array receiving returns from a floor of a body of water according to some embodiments discussed herein;

FIG. 10 shows a perspective view of a watercraft generating a plurality of receive beams in accordance with some embodiments discussed herein;

FIG. 11 shows a transmit beam emitted from a watercraft in accordance with some embodiments discussed herein;

FIGS. 12-14 show a plurality of transducer elements generating multiple receive beams in accordance with some embodiments discussed herein;

FIG. 15 shows a side view of a watercraft generating a receive beam in accordance with some embodiments discussed herein;

FIG. 16 shows a top-down view of a watercraft generating a plurality of receive beams in accordance with some embodiments discussed herein;

FIG. 17 shows a side view of a watercraft generating a plurality of receive beams in accordance with some embodiments discussed herein;

FIG. 18 shows a 3D perspective view of a simplified 3D image according to some embodiments discussed herein;

FIG. 19 shows an example 3D image of an underwater environment, in accordance with some example embodiments described herein; and FIG. 20 illustrates an example method of generating a 3D image in accordance with some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Sonar systems may transmit sonar waves into a body of water with a transmit transducer, a transmit/receive transducer, or similar device. When the sound waves strike anything of differing acoustic impedance (e.g., the sea floor or something suspended in the water above the bottom), the sound waves reflect off that object. These echoes or sonar returns may strike a sonar transducer or a separate sonar receiver element, which converts the echoes back into an electrical signal which is processed by a processor (e.g., sonar signal processor 22 shown in FIGS. 2-3) and sent to a display (e.g., an LCD) mounted in the cabin or other convenient location in the boat. This process is often called "sounding". Since the speed of sound in water may be determined by the properties of the water (approximately 4800 feet per second in fresh water), the time lapse between the transmitted signal and the received echoes can be measured and the distance to the objects determined. This process may repeat itself many times per second. The results of many soundings are used to build a picture on the display of the underwater environment. In some embodiments, a more complex array may be used to generate a picture in a single sounding.

With reference to FIG. 1, embodiments of the present invention may include a transducer array 100 having multiple transducer elements 105 cooperating to receive sonar returns from the underwater environment. The transducer elements may be arranged in a grid 110 in order to determine a three-dimensional position of each of the received returns. The grid 110 may include a plurality of rows $105_A$, $105_B$, $105_C$ of transducer elements, with each row including a plurality of elements 105. The plurality of rows $105_A$, $105_B$, $105_C$ may be disposed adjacent to one another to form a plurality of columns $105_1$, $105_2$, $105_3$ ... $105_N$ of transducer elements spanning the rows. Each of the respective rows or columns of transducer elements may be used to resolve an angle associated with the sonar returns. The respective angles determined by the plurality of rows and plurality of columns of transducer elements may be compared and combined to generate a three-dimensional position of the sonar returns.

Some embodiments of the present invention may process the returns received at each of the transducer elements in one or more configurations. In some embodiments, the returns from a plurality of the transducer elements may be compared via the process of interferometry to generate one or more angle values. Interferometry may involve determining the angle to a given sonar return via a phase difference between the returns received at two or more transducer elements. In some embodiments, the process of beamforming may be used in conjunction with the plurality of transducer elements to generate one or more angle values associated with each sonar return distance. Beamforming may involve generating a plurality of receive-beams at predetermined angles by spatially defining the beams based on the relative phasing of the sonar returns and detecting the distance of the sonar returns in each respective beam.

In some embodiments, fewer transducer elements may be utilized for interferometric processing than for beamforming, while beamforming may utilize a larger number of elements. As detailed herein, the transducer array may use solely beamforming, solely interferometry, or combinations of interferometry and beamforming to balance accuracy with complexity of the array. In some embodiments, the return data from one of the rows or columns of the grid may be processed using interferometry, while the return data from the other of the rows or columns of the grid may be processed using beamforming. The directions of the transducer array utilizing beamforming may include a relatively large number of transducer elements, while the directions of the transducer array utilizing interferometry may include a relatively smaller number of elements. In some embodiments, at least the interferometric portions of the transducer array may include minimally-redundant spacing.

Example System Architecture

FIG. 1 depicts an example transducer array 100 according to some embodiments discussed herein. The transducer array 100 may include a plurality of transducer elements 105 forming a grid 110 on a substrate 115 (e.g., a printed circuit board, PCB). The grid 110 of transducer elements 105 may form a plurality of rows $105_A$, $105_B$, $105_C$ and a plurality of columns $105_1$, $105_2$, $105_3$ ... $105_N$. Each of the transducer elements 105 may be configured to receive sonar pulses from an underwater environment. The returns from each transducer element 105 may then be processed based on the respective element's position in the grid 110 to generate three-dimensional position data associated with the sonar returns.

In some embodiments, as detailed below, the transducer array 100 may include any number of transducer elements. In some embodiments, the transducer array may include more columns $105_1$, $105_2$, $105_3$ ... $105_N$ (e.g., more elements in each row) than rows. Although some rows $105_A$, $105_B$, $105_C$ may be shown in a horizontal orientation, the transducer array 100 may be oriented at any desired configuration on or connected to a watercraft.

FIGS. 2-3 show a basic block diagram of a sonar system 20 capable for use with several embodiments of the present invention. As shown, the sonar system 20 may include a number of different modules or components, each of which may comprise any device or means embodied in either hardware, software, or a combination of hardware and software configured to perform one or more corresponding functions. For example, the sonar system 20 may include a sonar signal processor 22, a transceiver 24, and a transducer assembly 120. In some embodiments, the transceiver 24 may include a single transmit/receive component or separate transmit and receive components as detailed herein. In some embodiments, the transducer assembly may include a transducer array 100. The sonar system 20 may further include a storage module 26 for storing sonar return data and other data associated with the sonar system in a non-transitory computer readable medium. The sonar system 20 may also include one or more communications modules 28 configured to communicate with one another in any of a number of different manners including, for example, via a network. In this regard, the communications module 28 may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays 30 may be included in the sonar system 20. In some embodiments, one or more of the modules or components may be grouped into a sonar module 18. Additionally, in some embodiments, the sonar module 18 may be positioned within the transducer assembly 120.

With reference to FIG. 4, one or more sonar systems 20 may connect to external systems via the communications module 28. In this manner, the sonar system 20 may retrieve stored data from a remote, external server 40, 42 via a network 44 in addition to or as an alternative to the onboard storage module 26.

Referring back to FIG. 2, in some embodiments, the transducer array 100 may be configured to transmit and receive sonar pulses. In some embodiments, one or more of the transducer elements 105 in the transducer assembly 100 may be configured to transmit sonar pulses. In some further embodiments, one or more transducer elements at the center of the grid 110 (e.g., in an M×N array, element M/2, N/2) may transmit sonar pulses. Any other element of the transducer array 100 may additionally or alternatively be configured to transmit sonar pulses into the water. Referring to FIG. 3, in some embodiments, the transducer assembly 120 may include the transducer array 100 and a separate transmit transducer 50. The transmit transducer 50 may be disposed adjacent the transducer array 100 or within the transducer array (e.g., between two or more transducer elements).

Turning to FIG. 5, an example watercraft 10 is shown having a housing 125 including a transducer assembly (e.g., the transducer assembly 120 shown in FIG. 1) mounted in a downward and forward facing configuration. In the embodiment of FIG. 5, the housing 125 is mounted on the keel 12 of the watercraft 10; however, the housing or a separate transducer assembly may be mounted at any position on or off the center line of the watercraft. In some embodiments, the housing 125 may be mounted proximate the rear of the watercraft 10. The housing 125 may be oriented in substantially the same direction as the surface on which it is mounted; however, in other embodiments, the transducer array may be angled relative to the surface (e.g., a downward-facing version mounted proximate the front of the watercraft). In some embodiments, the housing 125 may be mounted forward of and/or above a planing water level, but below an idling or trolling water level, of the watercraft 10. In such embodiments, the housing 125 may be out of the water while the watercraft 10 is travelling at high speeds while remaining in the water when moving slowly.

Example Interferometry

As detailed herein, the transducer assembly (e.g., the transducer assembly 120 shown in FIG. 1) may be configured to transmit sonar pulses into the water and receive sonar returns as detailed herein. In some embodiments, the return data from any two or more elements (e.g., the transducer elements 105 shown in FIG. 1) may be compared via interferometry, to determine an angle associated with each sonar return. In some embodiments, the angle is disposed in a plane of the transducer elements.

With reference to FIGS. 6-9, the following is an explanation of an example use of interferometry to determine corresponding angles of the sonar returns. Turning to FIG. 6, a simplified example is shown of transducer elements 150, 152 receiving sonar returns A, B from a single point 158 at the floor 156 of a body of water or other reflecting surface to generate a point of return data including a distance and/or time to the point as well as an angle α. During actual interferometric sonar sounding, sonar returns may be received from across the entire beam width of the transmitted sonar pulses to generate a plurality of points of return data in one or more two-dimensional slices. The returns A, B may originate at the same time from the same point 158 and be received by each of the first 150 and second 152 transducer elements.

Each of the transducer elements 150, 152 may produce one-dimensional distance data in response to receiving sonar returns A, B, respectively, from the point 158. The sonar signal processor may combine this one-dimensional distance data from each element with the predetermined distance between the elements and the angle α between the orientation of the transducer elements 150, 152 and a surface of the body of water or other reference point to determine the position of the point 158 of origin of the sonar return. The position of the point 158 may be represented as two-dimensional coordinates with respect to the boat, housing or other reference point, or may alternatively be represented as a distance and angle from the reference point. In yet another embodiment, the position may be determined as an absolute position value by comparing the interferometric data with GPS or other positioning data.

In some embodiments, the location of the point of origin for the sonar returns may be determined via a phase difference between the returns received at the respective transducer elements 150, 152. Turning to FIG. 7, another simplified example of transducer elements 150, 152 receiving sonar returns A, B is shown. In this embodiment, the sonar returns from the point 158 are represented as waves A, B received by the first 150 and second 152 transducer elements. The returns A, B originating from the same point 158 on the floor of the body of water or other reflecting surface may have substantially the same frequency, amplitude, and wavelength. Given that the waves A, B may be expected to have the same properties when received at both the first 150 and second 152 transducer element, a phase difference between the two waves, in combination with the predetermined distance and angle of the transducer array, may provide the location of their point 158 of origin. As shown in FIG. 7, the returns A, B may be received by the respective transducer elements 150, 152 at different positions 160, 162 along the respective waves. The phase, or position, of the wave at the point it is received by the transducer elements may be compared to determine the angle of the point 158 of origin. In some embodiments, the angle (e.g., (shown in FIG. 7) may be derived by using an interferometer (e.g., as part of or separate from the sonar signal processor) to calculate a phase difference between the two returns which is converted into a single physical angle, which would be the angle from the seafloor point to the phase center of the array (the imaginary point directly between the two transducer elements being used for the interferometry calculation).

FIG. 8 shows a plot overlaying the returns A, B as received by each transducer element 150, 152 versus time. The phase difference θ between the returns A, B may indicate the degree of offset between the returns, which, when combined with the predetermined distance d, one-dimensional distance data, frequency of the returns, and/or angle of the transducer arrays may produce the position of the point 158 of origin. The angle β to the point 158 may be represented by the following Equation (1):

$$\beta = \arcsin\left(\frac{\lambda\theta}{2\pi d}\right) \tag{1}$$

Where λ represents the wavelength of the return, θ represents the received phase difference, and d represents the predetermined distance.

Though the above explanation focuses on two transducer elements, three or more transducer elements (e.g., transducer elements 150, 152, 154 shown in FIG. 9) may be used with embodiments of the present invention to determine angle information through interferometry.

In some embodiments, the transducer arrays may include more than two transducer elements. For example, FIG. 9 shows the example embodiment of FIG. 6 having three transducer elements 150, 152, 154. Each of the transducer elements 150, 152, 154 may be positioned a predetermined distance $d_1$, $d_2$, $d_3$ from each other. In some embodiments, the distance between elements may differ. In some embodiments, each element may be the same size. In some alternative embodiments, one or more of the elements may differ in size from the remaining elements.

In some further embodiments, the predetermined distance between elements may be minimally-redundant, such that two or more pairs of elements are spaced at a different predetermined distance. For example, in FIG. 9, each predetermined distance $d_1$, $d_2$, $d_3$ may be different, such that $d_1$ is less than $d_2$, which are both less than $d_3$. Alternatively, the spacing between elements may be interchanged (e.g., such that $d_1$ is greater than $d_2$). As detailed below, the minimally-redundant predetermined distances $d_1$, $d_2$, $d_3$ may allow each sub-array (e.g., each pairwise array within the transducer array) to generate a unique solution during the interferometric sounding process. In some alternative embodiments, the elements may be evenly spaced.

In some embodiments, the transducer elements 150, 152, 154 may be used in pairwise sub-arrays to generate more robust return data. For example, in the embodiment shown in FIG. 9, the first 150 and second 152 transducer elements may be used to determine the two dimensional return data of the positions of sonar returns in a manner similar to the two-element embodiments described herein (e.g., using a phase difference between the respective returns). Similarly, the second 152 and third 154 transducer elements may generate the two dimensional return data of the positions of the floor of the body of water or other reflecting surface (e.g., fish, objects, etc.). The first 150 and third 154 elements may also generate the two dimensional return data of the positions of the floor of the body of water or other reflecting surface as detailed herein. Alternatively, any subset of the individual pairs may be used. As detailed below, each of the pairwise sets of return data may then be correlated (e.g., combined, compared, among others) to generate a more robust set of return data.

These elements 150, 152, 154 may be electrified substantially simultaneously to receive the return data, and each of the pairwise comparisons may then be generated from the received data by the sonar signal processor. In some alternative embodiments, each of the pairs (e.g., the first 150 and second 152 elements, the first 150 and third 154 elements, and the second 152 and third 154 elements) may be sequentially electrified to receive sonar returns separately. In some embodiments, the transmitting transducer(s) may be electrified to transmit a sonar pulse and the receiving transducer(s) may be electrified at a predetermined time thereafter to receive the sonar returns from the transmitted pulse. In the sequential embodiments detailed herein, a single sonar pulse may be transmitted for all of the received pairwise returns, or, alternatively, multiple pulses may be transmitted.

Each of the pair-wise array combinations may be defined by the predetermined distance between the respective transducer elements. The acoustic receive sensitivity of each sub-array may vary depending on the predetermined distances between the elements of each array combination. As detailed above, the phase shift with respect to incident angle is related to the predetermined distance between the elements as rewritten in Equation (2):

$$\frac{2\pi}{\lambda}d\sin(\beta) = \theta \qquad (2)$$

Accordingly, the phase shift may vary with incident angle more rapidly for larger d. In some embodiments, a transducer array having multiple transducer elements may arrange the elements according to the minimally-redundant spacing techniques described herein in order to stagger the precision and noise of each sub-array to produce a more robust transducer array. In particular, a "coarse" array may have the smallest predetermined distance d (e.g., the predetermined distance $d_1$ between the leftmost elements 150, 152 of FIG. 9) and thus may be the least sensitive to changes in incident angle and may have the widest phase width. A "medium" array may have a predetermined distance d (e.g., the predetermined distance $d_2$ between the right element 154 and the center element 152 of FIG. 9) that is slightly larger and thus more sensitive to changes in angle. Finally, a "fine" array may have the largest predetermined distance d (e.g., the predetermined distance $d_3$ between the outer two elements 150, 154) and is thus most sensitive to changes in incident angle and has a narrow phase width (e.g., the fine array may phase wrap more frequently).

In the "coarse" array, the pair of elements may receive the least ambiguous data but may also generate the least precise data of the pairwise sub-arrays (e.g., least sensitive to changes in angle). In the "fine" array, the pair of elements may receive somewhat more ambiguous data, but may also generate the most precise data (e.g., most sensitive to changes in angle). In some embodiments, the coarse array produces less ambiguous data because phase wrapping may not occur within a desired range of angles that are ensonified, while the fine array may be more ambiguous because the phase may wrap within the ensonified area. In such embodiments, the coarse array may at least partially resolve the data from the fine array within a specific region, and a single solution may thereby be determined for the fine array.

In embodiments that generate more than one set of interferometric return data (e.g., the "coarse," "medium," and "fine" arrays of FIG. 9), the sets of return data may be correlated in a variety of ways to generate a final set of interferometric return data. In some embodiments, the sets of interferometric return data may be correlated by comparing the sets of data. For example, if three sets of data are used, the sonar signal processor may remove points of return data from one of the sets that substantially differ from the other two (e.g., to eliminate noise). When correlating two or more sets of data, two points that differ substantially between sets may both be removed. In some embodiments, multiple sets of interferometric return data may be correlated (e.g., compared, combined, among others) to generate a more robust set of return data with more data points.

In some embodiments, the results of each set of data may be averaged to produce a final result. For example, the angle determined to a given point by a first set of interferometric return data (e.g., a coarse array) may be averaged with the angle to the same point determined by a second set of interferometric return data (e.g., a fine array) to generate a final angle value. Similarly the distance, time, strength, phase, or component coordinate values may be averaged. In such embodiments, averaging the returns from each of the pairwise arrays may eliminate noise while also generating more precise return data. In some embodiments, weighting can be used for correlating the sets of data to produce the final result (e.g., the fine array may be weighted differently than the coarse array).

As discussed herein, the transmitting transducer (e.g., the transmit transducer 50 shown in FIG. 1) may transmit one or more sonar pulses downwardly and/or outwardly from the watercraft, and a plurality of transducer elements may receive the corresponding sonar returns in a pairwise fashion to generate interferometric sonar return data. In some embodiments, the interferometric return data may be received from two-dimensional slices of the underwater environment (e.g., beams having a narrow width in the direction of travel of the watercraft—thereby forming thin slices of a raw sonar data of the underwater environment). In this regard, each sonar return of the raw sonar data may be defined by, at least, a distance and an angle (e.g., 2D), which may be processed (e.g., by the sonar signal processor 22 of FIGS. 2-3) to generate 2D sonar data. Further, even though there may be some space within the narrow width of the beam, the 2D sonar returns can be defined to ignore that width and, thus, be assumed to be 2D. The 2D sonar data may be formed as point clouds with a plurality of points representing the returns from a reflecting surface of the body of water (e.g., fish, sea floor, etc.). In some embodiments, the sonar return data from the 2D slice are saved in memory for processing to form a 3D sonar return data, which may be displayed as a 3D image. In some embodiments 3D sonar return data representing a 3D image may be stored in a buffer prior to or in conjunction with display on the screen.

Additional embodiments of interferometric systems and 3D imaging systems are detailed in U.S. Provisional Application No. 62/128,635, filed Mar. 5, 2015, and entitled "*Systems and Associated Methods for Producing a* 3*D Sonar Image,*" which is hereby incorporated by reference herein in its entirety.

Although the embodiments of FIGS. 6, 7, and 9 depict vertically oriented interferometric sub-arrays, interferometry may be performed between any two or more transducer elements. In some embodiments, the transducer elements of a given sub-array are arranged linearly with respect to each other. In some embodiments, the sub-array may be a row or column of a grid of transducer elements. For example, with reference to FIG. 1, any row $105_A$, $105_B$, $105_C$ or column $105_1$, $105_2$, $105_3$ . . . $105_N$ of the grid 110 may be processed via interferometry to determine the angle of the sonar returns received in a given plane of the transducer elements. For example, in an embodiment where the rows $105_A$, $105_B$, $105_C$ of the grid are oriented substantially horizontally, interferometry may be performed in a substantially vertical plane (e.g., using at least one of columns $105_1$, $105_2$, $105_3$ . . . $105_N$) or in a substantially horizontal plane (e.g., using at least one of rows $105_A$, $105_B$, $105_C$). Similarly, in an embodiment where an axis connecting the elements in the columns $105_1$, $105_2$, $105_3$ . . . $105_N$ are substantially horizontal relative to the surface of the body of water, interferometry may be performed in a substantially horizontal plane (e.g., using at least one of columns $105_1$, $105_2$, $105_3$ . . . $105_N$) or in a substantially vertical plane (e.g., using at least one of rows $105_A$, $105_B$, $105_C$). As detailed herein, multiple rows or columns may be used to interferometrically process sonar returns from different areas of the underwater environment.

Example Beamforming

As also detailed herein, in some embodiments, the returns from a plurality of transducer elements may be processed via beamforming to generate distance data in each respective beam. For example, with reference to FIG. 10, a plurality of receive beams 205 are shown in a horizontal arrangement with respect to one another. As detailed below, these receive beams may be generated by one or more of the rows or columns of transducer elements forming a sub-array (e.g., the transducer elements 105 shown in FIG. 1). The beams may be formed in any orientation including substantially horizontally (e.g., the horizontally arranged beams 205 shown in FIG. 10), vertically (e.g., the vertically arranged beams shown in FIG. 17), or at another angle. Moreover the beamforming sub-array may be oriented in any direction including down, forward, backward, to either side, or combinations thereof.

With reference to FIG. 11, a single transmit beam 210 may be used to ensonify a wide area of the underwater environment and one or more of the receive transducer elements (e.g., the transducer elements 105 shown in FIG. 1) may receive sonar returns from the transmitted sonar pulses. In some embodiments, each of the transducer elements (e.g., the transducer elements 105 shown in FIG. 1) may receive sonar returns from the same transmitted sonar pulses. In some embodiments, the transmit transducer may be one or more of the transducer elements (e.g., the transducer elements 105 shown in FIG. 1) in the transducer array (e.g., the array 100 shown in FIG. 1). The transducer array 100 may further receive sonar returns with each element 105 from a single sonar pulse transmission.

Turning back to FIG. 1, beamforming may be performed with an array of transducer elements 105. In some embodiments a linear or curved row of transducer elements (e.g., one or more rows $105_A$, $105_B$, $105_C$ or columns $105_1$, $105_2$, $105_3$ . . . $105_N$) may be configured to process received sonar return data in separate "beams" by considering the sonar return data received from different angles relative to the array 100. In some embodiments, the sonar return data may be received by the transducer elements from a single pulse or series of pulses from the transmit beam, such that each of the beams (e.g., the beams 205 shown in FIG. 10) may be generated substantially simultaneously, rather than waiting for multiple sets of sonar pulses to traverse the distance from the watercraft to a reflected surface and back.

With reference to FIGS. 12-14, an example transducer sub-array including a plurality of transducer elements 171, 172, 173 is shown. In the embodiment shown in FIGS. 12-14, three receive beams 214, 216, 218 may be formed at angles $\alpha_1$, $\alpha_2$, and $\alpha_3$, respectively. Each of the receive beams 214, 216, 218 may define substantially the same beamwidth, and beams may be formed at any angle within the receive area of the transducer elements.

In an embodiment where $\alpha_2$ is 90 degrees (e.g., 0 degrees relative to a perpendicular receive direction of the transducer elements), the data from each channel at a given time, t, is summed together to form a beam at $\alpha_2$. To form a beam at $\alpha_1$, the signals received at each transducer element 171, 172, 173 may be aligned. For example, a signal originating from $\alpha_1$ may first arrive at the leftmost transducer element 171, then at the center transducer element 172, and finally at the rightmost transducer element 173. To align the channels, the leftmost transducer element 171 may be delayed by a predetermined number of samples (e.g., two samples) and the center transducer element 172 may be delayed by a second predetermined number of samples (e.g., one sample). The three channels corresponding to the three transducer elements 171, 172, 173 may then be summed together to generate a receive beam at $\alpha_1$.

Similarly, to form a beam at $\alpha_3$, the signals received at each transducer element 171, 172, 173 may be aligned at $\alpha_3$. For example, a signal originating from $\alpha_3$ may first arrive at the rightmost transducer element 173, then at the center transducer element 172, and finally at the leftmost transducer element 171. To align the channels, the rightmost transducer element 173 may be delayed by a predetermined number of samples (e.g., two samples) and the center transducer element 172 may be delayed by a second predetermined number of samples (e.g., one sample), with the leftmost transducer element 171 receiving no delay. The three channels corresponding to the three transducer elements 171, 172, 173 may then be summed together to generate a receive beam at $\alpha_3$.

The sonar return data may be formed into a plurality of beams by forcing phase differences to form a beam in a given direction. For example, the first receive beam 214, shown in FIG. 12, may align the received returns 215 at the first angle $\alpha_1$ as detailed above. Similarly, the second 216 and third 218 receive beams shown in FIGS. 13-14 may align the received returns 217, 219 at the second angle $\alpha_2$, and third angle $\alpha_3$, respectively. Based on the predetermined distance between each of the transducer elements, the delay of each transducer element's received samples may form a beam at a given phase difference between the transducer elements.

Although the example of FIGS. 12-14 depicts three transducer elements 171, 172, 173, any number of transducer elements may be used in a similar manner to form any number of receive beams. In some embodiments, the transducer elements may form greater than the number of transducer elements in a beamforming sub-array using one or more adaptive techniques. In some other embodiments, the number of receive beams may be equal to the number of transducer elements in a beamforming sub-array. In yet some other embodiments, the number of receive beams may be less than the number of transducer elements in a beamforming sub-array. In some embodiments, the receive beam angles $\alpha_1$, $\alpha_2$, and $\alpha_3$, may be defined symmetrically about a centerline of the transducer sub-array (e.g., 0 degrees relative to a perpendicular receive direction of the transducer elements). In some embodiments, the receive beams may be generated at least one degree apart.

Each received beam represents a beam of return data having a narrow width in a plane parallel with the row or column of transducer elements (e.g., the plane of the paper in FIGS. 12-14) and a wide width perpendicular to the row or column of transducer elements (e.g., perpendicular to the plane of the paper in FIGS. 12-14). For example, with reference to FIG. 15, one or more formed beams 205 may be configured to span vertically from near the surface of the body of water to a vertical or near vertical direction down. With reference to FIG. 16, the beams 205 may be narrower in a forming direction, in this instance a horizontal direction, in which the beams are formed. In the embodiments of FIGS. 15 and 16, the transducer elements used for beamforming may be arranged substantially horizontally, such that each of the beams 205 may be formed in portions of the horizontal dimension (e.g., an azimuthal dimension) shown in FIG. 16. The horizontal arrangement may refer to a straight or curved axis spanning the transducer elements, such that the receiving surfaces of the transducer elements may still be pointed at an incline relative to a horizontal plane while being arranged in the horizontal plane.

Turning to FIG. 17, in some alternative embodiments, the beamforming transducer elements may be arranged vertically such that the narrower, forming direction of the beams 305 is oriented horizontally. In such embodiments, each beam 305 may have a wide width across a full horizontal receive dimension of the transducer elements (e.g., the transducer elements 105 shown in FIG. 1) and a narrow beam width in the vertical, forming direction.

Although embodiments detailed herein show the formed beams 205, 305 directly abutting one another, the beams may be formed in any configuration such that the beams overlap, directly abut, or are spaced from one another. As shown in FIGS. 12-14, the beams may naturally overlap at close distances to the transducer elements 105 as each of the transducer elements is arranged in the forming direction.

Turning back to FIG. 1, the transducer array 100 may use beamforming in any direction. For example, the transducer elements 105 in one or more of the rows $105_A$, $105_B$, $105_C$ may be used for beamforming, such that each row may be configured to generate a plurality of receive beams (e.g., the beams 205, 305 shown in FIGS. 10 and 15-17). In some embodiments, as detailed herein, the rows $105_A$, $105_B$, $105_C$ may be oriented in any direction (e.g., horizontally, perpendicular to centerline of the watercraft, vertically, parallel to the centerline of the watercraft, or any other direction) such that the beams may be formed in a desired direction. Similarly, the columns $105_1$, $105_2$, $105_3$ . . . $105_N$ may be used for beamforming, such that each column may be configured to generate a plurality of receive beams (e.g., the beams 205, 305 shown in FIGS. 10 and 15-17). In some embodiments, as detailed herein, the columns $105_1$, $105_2$, $105_3$ . . . $105_N$ may be oriented in any direction (e.g., horizontally, perpendicular to centerline of the watercraft, vertically, parallel to the centerline of the watercraft, or any other direction) such that the beams may be formed in a desired direction. In some further embodiments, a diagonal series of transducer elements may be used for beamforming.

In some embodiments, two or more transducer elements may be used in a beamforming configuration (e.g., one or more of the rows $105_A$, $105_B$, $105_C$ or columns $105_1$, $105_2$, $105_3$ . . . $105_N$). In some embodiments, a large number of transducer elements may be used in the beamforming configuration. For example, as many as sixty four or more transducer elements may be used in a beamforming configuration. In some embodiments, eight or more transducer elements may be used in a beamforming configuration. In some embodiments, thirty two or fewer transducer elements may be used in a beamforming configuration.

With continued reference to FIG. 1, any or all of the rows $105_A$, $105_B$, $105_C$ or columns $105_1$, $105_2$, $105_3$ . . . $105_N$ may have a large number of transducer elements. Each transducer element added to an array or configuration of transducer elements creates an additional null in the beam pattern of the transducer elements. Each null may be moved or tuned via beamsteering to reduce interference. As such, having a large number of nulls may allow for better resolution of the underwater environment. As detailed herein, although FIG. 1 depicts 3 rows $105_A$, $105_B$, $105_C$ each having 24 transducer elements 105, any number of rows and columns (e.g., elements per row) may be used.

In some embodiments, the sonar return data from the 2D slice are saved in memory for processing to form a 3D sonar return data, which may be displayed as a 3D image. In some embodiments 3D sonar return data representing a 3D image may be stored in a buffer prior to or in conjunction with display on the screen. The 3D image may be formed as a 3D mesh of connected points, as detailed below, or may be further processed into a textured 3D image.

Combined Systems

In some embodiments, multiple sub-arrays of either or both interferometric and beamforming configurations may be used in the transducer array (e.g., the transducer array 100 shown in FIG. 1). These combined systems may be used to produce two and three dimensional images of the underwater environment. As discussed above, each of the interferometry and beamforming techniques generally resolves a two-dimensional section of the underwater environment. In some embodiments, both interferometry and beamforming may resolve sonar returns in a plane of the transducer elements in a given sub-array. In some embodiments, as detailed herein, multiple sub-arrays positioned in a respective first and second direction may be used to resolve the position data associated with a set of sonar return data in three dimensions. In some embodiments, the first and second directions may be non-parallel. In some further embodiments, the first and second directions may be substantially perpendicular to each other. The three dimensional position data may be represented as 3D sonar return data and may be further processed to form a 3D image as detailed herein.

In some embodiments, the multiple sub-arrays may be integrated into the same array (e.g., the transducer array 100 shown in FIG. 1) and may receive sonar pulses from the same transmit transducer. In other embodiments, multiple transmit transducers and/or separate arrays may be used.

In some embodiments, beamforming may be used in a first direction of a transducer array and interferometry may be used in a second direction. For example, with reference to FIG. 1, the grid 110 including the rows 105$_A$, 105$_B$, 105$_C$ and columns 105$_1$, 105$_2$, 105$_3$ . . . 105$_N$ may be used for interferometry in a first direction and for beamforming in a second direction. In some embodiments, two or more of the rows 105$_A$, 105$_B$, 105$_C$ may be used in a beamforming configuration such that each row 105$_A$, 105$_B$, 105$_C$ using beamforming generates a separate plurality of receive beams (e.g., a first plurality of receive beams and a second plurality of receive beams). Each of the sets of receive beams may substantially overlap to receive sonar returns from the same area of an underwater environment. With reference to FIG. 10, each of the two or more rows 105$_A$, 105$_B$, 105$_C$ using beamforming may generate a plurality of beams 205, such that each depicted beam 205 includes two or more overlapping beams (e.g., one from each row).

Within each overlapping beam, interferometry may be used between the transducer elements of the respective rows to determine the angle of the returns in each beam perpendicular to the forming direction of the rows. In such an embodiment, the rows 105$_A$, 105$_B$, 105$_C$ may resolve the position data of the sonar returns in a second direction (e.g., a plane including the longitudinal axis connecting the transducer elements 105 of each respective row) using beamforming, and the elements 105 of each row may resolve the position data of the sonar returns in a first direction (e.g., a plane in the wide width of each respective beam 205, 305) using interferometry. Interferometry may be performed within each beam 205, 305 by correlating the phase data received by the elements in each of the respective rows. In some embodiments, each of the two or more rows 105$_A$, 105$_B$, 105$_C$ may function collectively as an interferometer, such that each element 105 forms a portion of a single interferometry element corresponding to one of the rows.

As detailed above, in some embodiments, three or more rows 105$_A$, 105$_B$, 105$_C$ may be used. In such embodiments, the rows may include minimally-redundant spacing as detailed above. For example, with continued reference to FIG. 1, the first row 105$_A$ and the second row 105$_E$ may be spaced at a first predetermined distance d$_1$, the second row 105$_{13}$ and the third row 105$_C$ may be spaced at a second predetermined distance d$_2$, and the first row 105$_A$ and third row 105$_C$ may be spaced at a third predetermined distance d$_3$. Within each beamformed beam, "coarse," "medium," and "fine" arrays may be formed from combinations of data from each of the three or more respective rows 105$_A$, 105$_B$, 105$_C$. Based on the returns from each of these "coarse," "medium," and "fine" arrays, a 2D slice of sonar data may be generated for each beamformed beam. When processed with the beamforming data, each of the 2D slices of interferometric sonar data may be combined to generate a 3D image, as detailed below. In some further embodiments, the first predetermined distance d$_1$ may be 2λ/3, where λ represents the wavelength of the sonar returns. In some embodiments, the second predetermined distance d$_2$ may be 4λ/3 and may be double the first predetermined distance d$_1$. In some embodiments, the third predetermined distance d$_3$ may be 2λ. In some embodiments, the transducer elements in the beamforming direction (e.g., the elements in a given row) may be redundantly spaced.

In some embodiments, each row (e.g., the rows 105$_A$, 105$_B$, 105$_C$ of FIG. 1) may be approximately 8 inches long and 1 inch tall (e.g., vertically in the direction of the paper of FIG. 1). Within each row (e.g., the rows 105$_A$, 105$_B$, 105$_C$ of FIG. 1), the transducer elements 105 may be spaced (e.g., at a predetermined distance d$_4$) or abutting along a narrow direction of the transducer elements. In such embodiments, the transducer elements 105 may each be approximately one inch long (e.g., corresponding to the height of the row) and less than one inch wide.

As detailed herein, although some embodiments are described as having a "vertical" or "horizontal" configuration, these terms may be used to depict relative orientations (e.g., horizontal being perpendicular to vertical) rather than absolute planes in the body of water. Any of the embodiments of the transducer arrays detailed herein may be mounted in any of a number of configurations. For example, although the rows 105$_A$, 105$_B$, 105$_C$ of FIG. 1 are depicted horizontally on the sheet, they may be positioned horizontally, vertically, diagonally, or in any other configuration in which a planar or curved transducer array 100 may be mounted. By way of example, with reference to FIG. 5, a housing 125 including a transducer assembly (e.g., the transducer assembly 120 shown in FIG. 1) is shown mounted on the keel 12 of a water craft 10 and aimed at an angle relative to the surface of the body of water. In such a configuration the rows 105$_A$, 105$_B$, 105$_C$ of FIG. 1 may be oriented along the keel 12, perpendicular to the keel, or at a separate, diagonal angle to the keel. In some other embodiments, the transducer assembly may be mounted to the hull of the watercraft or to a separate housing connected to the watercraft as detailed above.

In each embodiment, the transducer array 100 may be oriented such that its emitting surface (e.g., the direction out of the page in FIG. 1) is aimed in a direction in which the user desires to capture an image and may be rotated about the emitting direction to orient the beamforming and/or interferometric sub-arrays in a desired configuration.

In some embodiments, beamforming may produce a better resolution of the sonar return data than the interferometry data. As detailed above, beamforming may have a greater number of nulls in its beam pattern than an interferometric array because the beamforming sub-arrays may have a greater number of transducer elements. In such embodiments, it may be costly and/or complex to produce an N by N array of beamformed transducer elements to generate a 3D image. In such embodiments, a hybrid array as disclosed herein, may provide the additional detail of beamforming in a first direction, while providing cost-effective resolution in a second direction using interferometry. In such embodiments, the beamforming sub-arrays may be oriented such that at least a component of the longitudinal axis of each sub-array (e.g., the longitudinal axis of the rows $105_A$, $105_B$, $105_C$ of FIG. 1) are oriented parallel to the direction of travel of the vessel to form vertically arranged beams (e.g., as shown in FIG. 17) and the interferometric processing may be performed between the rows in a horizontal direction. In such an embodiment, the beamforming direction of the array may vertically resolve the underwater environment while the interferometric direction of the array may horizontally resolve the underwater environment.

In some alternative embodiments, the beamforming sub-arrays may be oriented such that the longitudinal axis of each sub-array (e.g., the longitudinal axis of the rows $105_A$, $105_B$, $105_C$ of FIG. 1) are oriented perpendicular to the direction of travel of the vessel to form vertical beams (e.g., as shown in FIGS. 10 and 15-16) and the interferometric processing may be performed between the rows in a vertical direction. In such an embodiment, the beamforming direction of the array may horizontally resolve the underwater environment while the interferometric direction of the array may vertically resolve the underwater environment.

In some further embodiments, the transducer array (e.g., the transducer array 100 shown in FIG. 1) may be oriented directly downwardly or in another orientation, as described herein. In a downward orientation, the beamforming sub-arrays may be used parallel to the direction of travel of the watercraft, perpendicular to the direction of travel of the watercraft, at a separate angle to the direction of travel of the watercraft, or may be movable by a user (e.g., on a movable housing, as detailed herein).

Alternatively, some embodiments of the transducer array may use beamforming in two, substantially perpendicular directions. In some alternative embodiments, the transducer array may use interferometry in two, substantially perpendicular directions. In such embodiments, the transducer elements may be spaced and configured as detailed herein, and the transducer elements may further be a symmetrical shape such that the array forms a grid of sonar return data.

In contrast to existing systems, embodiments of the present invention may transmit a single sonar pulse or a small set of sonar pulses into a wide area of the underwater environment to generate a 3D image of the underwater environment. The transducer elements may receive sonar returns from a single ping and, based on the relative phasing, distance, and/or amplitude of the sonar returns, may process the returns to generate three-dimensional position data as detailed herein. In such embodiments, it is not necessary for the watercraft to be moving to generate the three-dimensional data, nor is it necessary to transmit multiple sonar pulses to different, narrow areas of the underwater environment.

With reference to FIG. 20, a flow diagram is shown illustrating an example embodiment of the present invention. In some embodiments, the method may include transmitting sonar pulses into a body of water 2000. The method may further include receiving, via a first transducer element of a first row of transducer elements in a transducer array, first sonar returns from the transmitted sonar pulses and converting the first sonar returns into first sonar return data 2005. The method may include receiving, via a second transducer element of the first row of transducer elements in a transducer array, second sonar returns from the transmitted sonar pulses and converting the second sonar returns into second sonar return data 2010. Additionally, the method may include receiving, via a third transducer element of a second row of transducer elements in a transducer array, third sonar returns from the transmitted sonar pulses and converting the third sonar returns into third sonar return data 2015. The method may further include receiving, via a fourth transducer element of the second row of transducer elements in a transducer array, fourth sonar returns from the transmitted sonar pulses and converting the fourth sonar returns into fourth sonar return data 2020. In some embodiments, the method may further include processing, via a sonar signal processor, the first sonar return data and the second sonar return data to generate a plurality of first array sonar return data corresponding to a plurality of first receive beams each oriented at a different predetermined angle 2025, and may include processing the third sonar return data and the fourth sonar return data to generate a plurality of second array sonar return data corresponding to a plurality of second receive beams each oriented at the different predetermined angles 2030. Moreover, the method may include generating 3D sonar return data by generating one or more second angles within each of the plurality of first receive beams by comparing the plurality of first array sonar return data and the plurality of second array sonar return data at each of the different predetermined angles 2035. The method may then generate a 3D image based on the generated set of 3D sonar return data 2040. Although steps 2005, 2010, 2015, and 2020 are shown sequentially in FIG. 20, these steps may be performed in any order or concurrently with one another. Similarly, steps 2025 and 2030 may be performed in any order or concurrently.

Processing and Display

In some embodiments, the 3D image may be formed as 3D mesh image data. The 3D mesh image data may be produced by combining the points of position data onto a 3D grid to create a 3D point cloud of individual data points. The 3D point cloud may then be processed (e.g., using the sonar signal processor 22) to generate a mesh based on the overall topography of the point cloud.

For example, in hybrid beamforming and interferometric embodiments, interferometric position data from 2D slices of the underwater environment corresponding to each formed beam (from the beamforming) may be processed to produce sets of 2D sonar data. In some embodiments, 2D sonar data may be processed with one or more adjacent sets of 2D sonar data to produce an adjusted set of sonar data. The adjusted set of sonar data may include interpolated connections between the points of 2D sonar data and/or between adjacent sets of 2D sonar data to visualize the 2D slices of the underwater environment. The adjusted set of sonar data may represent continuous contours or topographical meshes such that the 3D mesh data may be formed by connecting the adjusted sets of sonar data with connecting gridlines 320, as shown in FIG. 18.

2D sonar data or adjusted 2D sonar data may be grouped and processed into sub-combinations or subsets of data before generating final 3D mesh data for the 3D image. In some embodiments, the 3D mesh data may be stored or displayed in multiple, smaller segments that connect with one another, rather than using a single, large set of 3D mesh data. For example, after a predetermined number of sets of 2D sonar data or after a predetermined memory limit, the 3D mesh data may separate and begin a new segment of 3D mesh data. In some further embodiments, additional or fewer processing steps may be required to convert the raw sonar data into 3D mesh data, and the present disclosure envisions any means of converting raw sonar return data into 3D mesh data.

In some embodiments, the sonar signal processor may be configured to reconstruct objects within the underwater environment (e.g., fish, trees, submerged watercraft, etc.) and use the generated mesh to generate the 3D image data. Additionally or alternatively, only portions of the underwater environment may be reconstructed (e.g., just the bottom surface, or just the bottom surface and fish, etc.). The remaining raw sonar return data could be used to form the remainder of the 3D image data (e.g., using the raw sonar returns or presenting an icon (e.g., fish icon) in place of or over raw sonar returns that have been determined to correspond to an object represented by the icon). U.S. Patent Application Ser. No. 62/128,641, filed Mar. 5, 2015, entitled "Methods and Apparatuses for Reconstructing a 3D Sonar Image", provides additional detail regarding example systems and methods of reconstructing a 3D image and is hereby incorporated by reference herein in its entirety.

In some embodiments, raw sonar data may be used to form the 3D image data. In some embodiments, a combination of the above noted techniques can be used to form the 3D image data. For example, the bottom surface may be reconstructed and used to generate the 3D image data and the objects within the water column may be updated using the raw sonar data with positioning based on the detected heading.

In some embodiments, the 3D image may be displayed in a perspective view such that the contour of the floor of the body of water is visualized in three dimensions. Additionally, in some embodiments, the 3D image may also be turned with the movement of the boat such that the 3D image appears to turn with the watercraft and/or transducer assembly. In this regard, the display may be north up, boat up, transducer assembly up, or a user-defined direction up.

In any of the embodiments detailed above, a display (e.g., the display 30 of the sonar system 20 shown in FIGS. 2-3) may present one or more sets of data (e.g., depth, sonar, weather, GPS, fish finder, etc.). Combinations of any of the above-referenced sets of data, in addition to chart information, radar, weather, or any other type of information relevant to watercraft, may be presented simultaneously on the display (e.g., via split screen). A user may select any of the possible combinations of display, or a sonar system may update the display based on a desired mode or the characteristics of the boat's motion. For example, the sonar system may automatically add a split-screen view of a downscan sonar image when a boat is idling or an engine is shut off (e.g., when trolling).

In some further embodiments, various sets of data, referred to above, may be superimposed or overlaid onto one another. For example, the 3D image may be applied to a chart information (e.g., a map or navigational chart). Additionally or alternatively, depth information, weather information, radar information, or any other sonar system inputs may be applied to one another. For example, weather or radar information may be added above the boat in the perspective view of the 3D image.

The 3D image may further show terrain features on the bottom of the body of water. For example, a hump 328 is shown in the 3D image of the 3D mesh data representing a raised plateau on the bottom of the body of water. In some embodiments, the gridlines 320 may represent squares of connected data points. In some alternative embodiments, the surface may be reconstructed as triangles in order to resolve the surface contour.

In some embodiments, the adjusted sets of sonar data may be rendered and plotted by the sonar system in conjunction with positioning information (e.g., GPS, inertial sensors, dead reckoning positioning, etc.). The positioning information may define a location of the position data generated by the transducer array, which is then used to adjust the position of the sonar data on the display 30 relative to the previous sets of sonar data. In some further embodiments, the positioning information may define an actual geographic position, such that the location and orientation of the sonar data represent an absolute position from which the slice was sounded. In such embodiments, the device may be scaled and oriented onto a chart, to represent a 3D image of the reflected surfaces in the body of water at the same position on the chart.

In some embodiments, the three-dimensional position data may also include objects in the water column, such as the vessel, fish, obstacles, etc. In some alternative embodiments, separate three-dimensional position data may be generated for objects in the water column (e.g., the vessel, fish, obstacles, etc.).

In some embodiments, the 3D mesh data detailed above may be further processed (e.g., by the sonar signal processor 22) to generate a more complex 3D image. The 3D mesh data may be processed to represent a smoother image that may give the user an intuitive understanding of the features of the bottom of the body of water. In some embodiments, the sonar system may apply textures or surfaces to the 3D mesh data to indicate the contour, density, depth, or any other characteristic of the imaged surfaces. For example additional textures or colors may be applied if upcoming features are too shallow for a watercraft to pass over safely.

FIG. 19 illustrates an example 3D image that may be displayed to a user. The 3D image shows the underwater environment 500 from a perspective of a viewer to the upper right of the watercraft 510. The bottom surface 530 of the underwater environment may be displayed and individual raw sonar returns 540 may also be displayed in the water column. A vertical plane 520 may be shown to indicate the current direction of the transducer assembly (though other icons or indicators may be used). Similarly, one or more arcs (not shown) may be displayed to represent the width of the received beams. In other embodiments, the vertical plane 520 may be used as a marker for showing updated 3D sonar image data as it is updated on the screen. In such an embodiment, the vertical plane 520 could instead (or in addition) include a horizontal plane showing the updated 3D sonar image data as it is updated on the screen.

In some further embodiments, 2D images may be generated from the three-dimensional position data. In some embodiments, a top-down 2D image may be presented to a user showing upcoming underwater features at a predetermined depth. Additionally or alternatively, a side view 2D image may be presented showing the profile of the underwater environment in a predetermined direction (e.g., directly ahead of the watercraft).

Example System Hardware

In some embodiments, the transducer assembly (e.g., the transducer assembly 120 shown in FIGS. 2, 3, and 5) may include a housing (e.g., the housing 125 shown in FIG. 5) that may include mounting holes through which screws, rivets, bolts or other mounting devices may be passed in order to fix the housing to a mounting bracket, a device attached to a watercraft or to the hull of the watercraft itself. However, in some cases, the housing may be affixed by welding, adhesive, snap fit or other coupling means. The housing may be mounted to a portion of the vessel, or to a device attached to the vessel, that provides a relatively unobstructed view of both sides of the vessel. Thus, for example, the transducer assembly may be mounted on or near the keel (or centerline) of the vessel (e.g., as shown in FIG. 5), on a fixed or adjustable mounting bracket that extends below a depth of the keel (or centerline) of the vessel, or on a mounting device that is offset from the bow or stern of the vessel (e.g., towfish, trolling motor, etc.). In some embodiments, the sonar module (e.g., the sonar module 18 of FIG. 2) may have one or more components, such as the sonar signal processor 22, positioned within the housing. In some embodiments, the housing may be oriented forward or downward and forward to image an area in front of the watercraft. In some other embodiments the housing may be oriented substantially downwardly to image an area below and/or outwardly to the sides or front of the watercraft. In yet some other embodiments, the housing may be movable, such that a user may orient the housing in a desired direction. The transducer array 100 may include one or more transducer elements 105 positioned within the housing, as described in greater detail herein. In some embodiments, each of the transducer elements may be positioned within the housing so as to point toward a predetermined area under, to the front, or to the side of the watercraft.

The housing (not shown) may include a recessed portion defining containment volume for holding the transducer components. The recessed portion defining the containment volume may extend away from the hull of the vessel on which the housing is mounted and therefore protrude into the water on which the vessel operates (or in which the vessel operates in a case where the transducer assembly is mounted to a tow fish or other submersible device). To prevent cavitation or the production of bubbles due to uneven flow over the housing, the housing (and in particular the containment volume portion of the housing) may have a gradual, rounded or otherwise streamlined profile to permit laminar flow of water over the housing. In some examples, an insulated cable may provide a conduit for wiring (e.g., transmitter circuitry 34 or receiver circuitry 35 shown in FIGS. 2-3) to couple each of the transducer elements (e.g., the transducer elements 105 shown in FIG. 1) to the sonar module 18. As detailed herein, any of a number of configurations of transducer elements and transducer arrays may be provided within the housing.

The shape of a transducer element may largely determine the type of beam that is formed when that transducer element transmits a sonar pulse (e.g., a circular transducer element emits a cone-shaped beam, a linear transducer emits a fan-shaped beam, etc.). In some embodiments, a transducer element may comprise one or more transducer elements positioned to form one transducer element. For example, a linear transducer element may comprise two or more rectangular transducer elements aligned with each other so as to be collinear. In some embodiments, three transducer elements aligned in a collinear fashion (e.g., end to end) may define one linear transducer element.

Likewise, transducer elements may comprise different types of materials that cause different sonar pulse properties upon transmission. For example, the type of material may determine the strength of the sonar pulse. Additionally, the type of material may affect the sonar returns received by the transducer element. As such, embodiments of the present invention are not meant to limit the shape or material of the transducer elements. Indeed, while depicted and described embodiments generally detail a linear transducer element made of piezoelectric material, other shapes and types of material are applicable to embodiments of the present invention.

In some embodiments, each of the transducer elements (e.g., transducer elements 105 shown in FIG. 1) may be a linear transducer element. Thus, for example, each of the transducer elements may be substantially rectangular in shape and made from a piezoelectric material such as a piezoelectric ceramic material, as is well known in the art. As shown in FIG. 1, the sonar array 100 may include an absorptive material (e.g., a portion of the substrate 115 shown in FIG. 1) forming mounting slots that hold the transducer elements 105.

As noted above, any of the transducer elements described herein (e.g., transducer elements 105 shown in FIG. 1) may be configured to transmit and receive sonar pulses (e.g., transmit/receive transducer elements). In some embodiments, one or more separate transmit transducers may be provided to ensonify the underwater environment. In such embodiments, the transmit transducer (e.g., the transmit transducer 50 shown in FIG. 1) may be positioned adjacent the transducer array, within the transducer array, or at a separate position on the watercraft. Although the transmit transducer 50 in claim 1 is shown between the rows $105_B$ and $105_C$ of the transducer array 100, the transmit transducer may be positioned at any location within the transducer assembly 120 or may be positioned outside of the transducer assembly (e.g., at another point in the housing or on the watercraft). While the transducer elements may be described herein as transmit/receive transducer elements, in some embodiments, the transducer elements may be configured as receive-only transducer elements, or in other cases, transmit-only transducer elements.

In transducer elements that transmit, during transmission of sonar pulses, the piezoelectric material, being disposed in a rectangular arrangement, provides for an approximation of a linear array having beamwidth characteristics that are a function of the length and width of the rectangular face of the transducer elements and the frequency of operation. In an example embodiment, a transducer element may be configured to operate in accordance with at least two operating frequencies. In this regard, for example, a frequency selection capability may be provided by the sonar module 18 to enable the user to select one of at least two frequencies of operation.

It should be noted that although the widths of various beams are shown and described herein, the widths being referred to do not necessarily correspond to actual edges defining limits to where energy is placed in the water. As such, although beams, beam patterns and projections of beam patterns are generally shown and described herein as having fixed and typically geometrically shaped and sharply defined boundaries, those boundaries merely correspond to the −3 dB (or half power) points for the transmitted beams. In other words, energy measured outside of the boundaries shown is less than half of the energy transmitted, but this sound energy is present nonetheless. Thus, some of the boundaries shown are merely theoretical half power point boundaries.

The transducer elements can convert electrical energy into sound energy (i.e., transmit) and also convert sound energy (e.g., via detected pressure changes) into an electrical signal (i.e., receive), although some transducers may act only as a hydrophone for converting sound energy into an electrical signal without operating as a transmitter, or only operating to convert an electrical signal into sound energy without operating as a receiver. Depending on the desired operation of the transducer assembly, each of the transducer elements may be configured to transmit sonar pulses and/or receive sonar returns as desired. In some embodiments, the transducer assembly 120 may comprise a combination of transducer elements and/or arrays that are configured to transmit sonar pulses and receive sonar returns, transducer elements that are configured to transmit sonar pulses only, and/or transducer elements that are configured to receive sonar returns only.

The active element in a given transducer may comprise at least one crystal. Wires are soldered to these coatings so the crystal can be attached to a cable which transfers the electrical energy from the transmitter to the crystal. As an example, when the frequency of the electrical signal is the same as the mechanical resonant frequency of the crystal, the crystal moves, creating sound waves at that frequency. The shape of the crystal determines both its resonant frequency and shape and angle of the emanated sound beam. Further information regarding creation of sound energy by differently shaped transducer elements may be found in the article "ITC Application Equations for Underwater Sound Transducers", which was published by International Transducer Corporation in 1995, Rev. 8/00, which is hereby incorporated by reference in its entirety.

Frequencies used by sonar devices vary but the most common ones range from 50 KHz to over 900 KHz depending on application. Some sonar systems vary the frequency within each sonar pulse using "chirp" technology. These frequencies are in the ultrasonic sound spectrum and are inaudible to humans.

In an example embodiment, with reference to FIGS. 2-3 the sonar signal processor 22, the transceiver 24, the storage module 26 and/or the communications module 28 may form a sonar module 18. As such, for example, in some cases, the transducer assembly 120 may simply be placed into communication with the sonar module 18, which may itself be a mobile device that may be placed (but not necessarily mounted in a fixed arrangement) in the vessel to permit easy installation of one or more displays 40, each of which may be remotely located from each other and operable independent of each other. In this regard, for example, the communications module 28 may include one or more corresponding interface ports for placing the network in communication with each display 30 in a plug-n-play manner. As such, for example, the communications module 28 may not only include the hardware needed to enable the displays 30 to be plugged into communication with the network via the communications module, but the communications module 28 may also include or otherwise be in communication with software modules for providing information to enable the sonar module 18 to communicate with one or more different instances of the display 30 that may or may not be the same model or type of display and that may display the same or different information. In other words, the sonar module 18 may store configuration settings defining a predefined set of display types with which the sonar module is compatible so that if any of the predefined set of display types are placed into communication with the sonar module 18, the sonar module 18 may operate in a plug-n-play manner with the corresponding display types. Accordingly, the sonar module 18 may include the storage module 26 storing device drivers accessible to the communications module 38 to enable the sonar module 18 to properly work with displays for which the sonar module 18 is compatible. The sonar module 18 may also be enabled to be upgraded with additional device drivers or transceivers to enable expansion of the numbers and types of devices with which the sonar module 18 may be compatible. In some cases, the user may select a display type to check whether a display type is supported and, if the display type is not supported, contact a network entity to request software and/or drivers for enabling support of the corresponding display type.

The sonar signal processor 22 may be any means such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the sonar signal processor 22 as described herein. In this regard, the sonar signal processor 22 may be configured to analyze electrical signals communicated thereto by the transceiver 24 to provide sonar data indicative of the size, location, shape, etc. of objects detected by the sonar system 20. For example, the sonar signal processor 22 may be configured to receive sonar return data and process the sonar return data to generate sonar image data for display to a user (e.g., on display 30). Moreover, in some embodiments, the sonar signal processor 22 may be configured to receive additional sonar return data (e.g., downscan or sidescan sonar return data) for processing and generation of sonar image data for display to a user.

In some cases, the sonar signal processor 22 may include a processor, a processing element, a coprocessor, a controller or various other processing means or devices including integrated circuits such as, for example, an ASIC, FPGA or hardware accelerator, that is configured to execute various programmed operations or instructions stored in a memory device. The sonar signal processor 22 may further or alternatively embody multiple compatible additional hardware or hardware and software items to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc. Still further, the processor, in combination with the storage module 26, may store incoming transducer data or screen images for future playback or transfer, or alter images with additional processing to implement zoom or lateral movement, or to correlate data, such as fish or bottom features to a GPS position or temperature. In an exemplary embodiment, the sonar signal processor 22 may execute commercially available software for controlling the transceiver 24 and/or transducer assembly 120 and for processing data received therefrom.

The transceiver 24 may be any means such as a device or circuitry operating in accordance with software or otherwise embodied in hardware or a combination of hardware and software (e.g., a processor operating under software control or the processor embodied as an ASIC or FPGA specifically configured to perform the operations described herein, or a combination thereof) thereby configuring the device or circuitry to perform the corresponding functions of the transceiver 24 as described herein. In this regard, for example, the transceiver 24 may include (or be in communication with) circuitry (e.g., transmitter circuitry 34 shown in FIGS. 2-3) for providing one or more transmission electrical signals to the transducer assembly 120 for conversion to sound pressure signals based on the provided electrical signals to be transmitted as a sonar pulse. The transceiver 24 may also include (or be in communication with) circuitry (e.g., receiver circuitry 35 shown in FIGS. 2-3) for receiving one or more electrical signals produced by the transducer assembly 120 responsive to sound pressure signals received at the transducer assembly 120 based on echo or other return signals received in response to the transmission of a sonar pulse. The transceiver 24 may be in communication with the sonar signal processor 22 to both receive instructions regarding the transmission of sonar signals and to provide information on sonar returns to the sonar signal processor 22 for analysis and ultimately for driving one or more of the displays 30 based on the sonar returns. In some embodiments, the transmitter circuitry 34 and/or receiver circuitry 35 may be positioned within the transceiver 24 or sonar module 18. In other embodiments the transmitter circuitry 34 and/or receiver circuitry 35 may be positioned within the transducer assembly 120. Likewise, in some embodiments, the transmitter circuitry 34 and/or receiver circuitry 35 may be positioned separate from the transducer assembly 120 and transceiver 24/sonar module 18.

The display 30 may be configured to display images and may include or otherwise be in communication with a user interface 32 configured to receive an input from a user. The display 30 may be, for example, a conventional LCD (liquid crystal display), a touch screen display, mobile device, or any other suitable display known in the art upon which images may be displayed. Although the display 30 of FIG. 2 is shown as being connected to the sonar signal processor 22 via the communications module 38 (e.g., via a network and/or via an Ethernet hub), the display 30 could alternatively be in direct communication with the sonar signal processor 22 in some embodiments, or the display 30, sonar signal processor 22 and user interface 32 could be in a single housing. The user interface 32 may include, for example, a keyboard, keypad, function keys, mouse, scrolling device, input/output ports, touch screen, or any other mechanism by which a user may interface with the system. Moreover, in some cases, the user interface 32 may be a portion of one or more of the displays 30.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A sonar system for imaging an underwater environment comprising:
a housing mountable to a watercraft;
a transducer array within the housing and aimed at least partially downwardly from the watercraft;
wherein the transducer array defines a first row of transducer elements and a second row of transducer elements;
wherein the first row of transducer elements comprises at least a first transducer element and a second transducer element;
wherein the first transducer element is configured to receive first sonar returns from sonar pulses transmitted into the underwater environment and convert sound energy of the first sonar returns into first sonar return data;
wherein the second transducer element is configured to receive second sonar returns from the sonar pulses transmitted into the underwater environment and convert sound energy of the second sonar returns into second sonar return data;
wherein the second row of transducer elements comprises at least a third transducer element and a fourth transducer element;
wherein the third transducer element is configured to receive third sonar returns from the sonar pulses transmitted into the underwater environment and convert sound energy of the third sonar returns into third sonar return data;
wherein the fourth transducer element is configured to receive fourth sonar returns from the sonar pulses transmitted into the underwater environment and convert sound energy of the fourth sonar returns into fourth sonar return data;
wherein the first row of transducer elements is disposed proximate the second row of transducer elements such that the first transducer element is positioned in the housing at a predetermined distance from the third transducer element and the second transducer element is positioned in the housing at the predetermined distance from the fourth transducer element;
a sonar signal processor configured to:
process the first sonar return data and the second sonar return data to generate a plurality of first array sonar return data that correspond to a plurality of first receive beams that are each oriented at different predetermined angles with respect to each other;
process the third sonar return data and the fourth sonar return data to generate a plurality of second array sonar return data that correspond to a plurality of second receive beams that are each oriented at the different predetermined angles with respect to each other;
generate, based on the first sonar return data, the second sonar return data, the third sonar return data, and the fourth sonar return data, a set of 3D sonar return data associated with the underwater environment by:
generating one or more second angles within each of the plurality of first receive beams by correlating the plurality of first array sonar return data and the plurality of second array sonar return data at each of the different predetermined angles, wherein the correlation is based on the predetermined distance, and wherein the second angle is perpendicular to the different predetermined angle of each corresponding first receive beam; and
generate a 3D image based on the generated set of 3D sonar return data.

2. The sonar system of claim 1, wherein the predetermined distance is a first predetermined distance, wherein the transducer array further comprises:
a third row of transducer elements comprises at least a fifth transducer element and a sixth transducer element;
wherein the fifth transducer element is configured to receive fifth sonar returns from the sonar pulses transmitted into the underwater environment and convert sound energy of the fifth sonar returns into fifth sonar return data;

wherein the sixth transducer element is configured to receive sixth sonar returns from the sonar pulses transmitted into the underwater environment and convert sound energy of the sixth sonar returns into sixth sonar return data;

wherein the third row of transducer elements is disposed adjacent the second row of transducer elements, such that the fifth transducer element is positioned in the housing at a second predetermined distance from the third transducer element and the sixth transducer element is positioned in the housing at the second predetermined distance from the fourth transducer element;

wherein the sonar signal processor is further configured to process the fifth sonar return data and the sixth sonar return data to generate a plurality of third array sonar return data that correspond to a plurality of third receive beams that are each oriented at the different predetermined angles with respect to each other; and wherein the sonar signal processor is further configured to generate the second angle within each of the plurality of first receive beams based on a correlation among the plurality of first array sonar return data, the plurality of second array sonar return data, and the plurality of third array sonar return data.

3. The sonar system of claim 2, wherein the first predetermined distance is different than the second predetermined distance.

4. The sonar system of claim 3, wherein the first predetermined distance is half the second predetermined distance.

5. The sonar system of claim 2, wherein the fifth transducer element is positioned in the housing at a third predetermined distance from the first transducer element and the sixth transducer element is positioned in the housing at the third predetermined distance from the second transducer element.

6. The sonar system of claim 1, wherein the first row and the second row are oriented horizontally, such that a first axis spanning the first transducer element and the second transducer element and a second axis spanning the third transducer element and the fourth transducer element are configured to be disposed perpendicular to a centerline of the watercraft.

7. The sonar system of claim 1, wherein the first row and the second row are oriented at least partially vertically, such that at least a component of a first axis spanning the first transducer element and the second transducer element and at least a component a second axis spanning the third transducer element and the fourth transducer element are configured to be disposed parallel to a centerline of the watercraft.

8. The sonar system of claim 1, wherein the first row of transducer elements further comprises a fifth transducer element configured to receive fifth sonar returns from the sonar pulses transmitted into the underwater environment and convert sound energy of the fifth sonar returns into fifth sonar return data, wherein the second row of transducer elements further comprises a sixth transducer element configured to receive sixth sonar returns from the sonar pulses transmitted into the underwater environment and convert sound energy of the sixth sonar returns into sixth sonar return data, wherein the sonar signal processor is further configured to process the fifth sonar return data with the first sonar return data and the second sonar return data to generate the plurality of first array sonar return data, and wherein the sonar signal processor is further configured to process the sixth sonar return data with the third sonar return data and the fourth sonar return data to generate the plurality of second array sonar return data.

9. The sonar system of claim 1, wherein each of the first row of transducer elements and the second row of transducer elements include more transducer elements than a number of rows of transducer elements.

10. The sonar system of claim 1, wherein the first transducer element is formed of a plurality of transducer elements electrically connected to act as the first transducer element.

11. The sonar system of claim 1, wherein the transducer array defines a substantially planar shape, such that each of the first transducer element, the second transducer element, the third transducer element, and the fourth transducer element are arranged on a plane.

12. The sonar system of claim 1, wherein the transducer array defines a receiving surface that corresponds to a receiving surface of the first transducer element, a receiving surface of the second transducer element, a receiving surface of the third transducer element, and a receiving surface of the fourth transducer element, wherein the receiving surface is curved such that the receiving surface of the first transducer element and the receiving surface of the third transducer element are configured to define different angles with respect to the surface of the body of water.

13. The sonar system of claim 12, wherein the receiving surface of the first transducer element and the receiving surface of the second transducer element define a same angle with respect to the surface of the body of water.

14. The sonar system of claim 1, wherein the transducer array defines a receiving surface that corresponds to a receiving surface of the first transducer element, a receiving surface of the second transducer element, a receiving surface of the third transducer element, and a receiving surface of the fourth transducer element, wherein the receiving surface is curved such that the receiving surface of the first transducer element and the receiving surface of the second transducer element are configured to define different angles with respect to the surface of the body of water.

15. The sonar system of claim 14, wherein the receiving surface of the first transducer element and the receiving surface of the third transducer element define a same angle with respect to the surface of the body of water.

16. The sonar system of claim 1, wherein the transducer array defines a receiving surface, and wherein the receiving surface is configured to be oriented downwardly and forwardly from the watercraft.

17. The sonar system of claim 1, wherein the transducer array defines a receiving surface, and wherein the receiving surface is configured to be oriented downwardly from the watercraft such that the receiving surface is configured to be oriented substantially perpendicular to the surface of the body of water.

18. A transducer assembly for imaging an underwater environment comprising:
a housing mountable to a watercraft;
a transducer array within the housing and aimed at least partially downwardly from the watercraft;
wherein the transducer array defines a first row of transducer elements and a second row of transducer elements;
wherein the first row of transducer elements comprises at least a first transducer element and a second transducer element;
wherein the first transducer element is configured to receive first sonar returns from sonar pulses transmitted into the underwater environment and convert sound energy of the first sonar returns into first sonar return data;
wherein the second transducer element is configured to receive second sonar returns from the sonar pulses transmitted into the underwater environment and convert sound energy of the second sonar returns into second sonar return data;
wherein the second row of transducer elements comprises at least a third transducer element and a fourth transducer element;
wherein the third transducer element is configured to receive third sonar returns from the sonar pulses transmitted into the underwater environment and convert sound energy of the third sonar returns into third sonar return data;
wherein the fourth transducer element is configured to receive fourth sonar returns from the sonar pulses transmitted into the underwater environment and convert sound energy of the fourth sonar returns into fourth sonar return data;
wherein the first row of transducer elements is disposed proximate the second row of transducer elements such that the first transducer element is positioned in the housing at a predetermined distance from the third transducer element and the second transducer element is positioned in the housing at the predetermined distance from the fourth transducer element;
wherein the first and second transducer elements are configured to transmit the first sonar return data and the second sonar return data, respectively, to a sonar signal processor to generate a plurality of first array sonar return data that correspond to a plurality of first receive beams that are each oriented at different predetermined angles with respect to each other;
wherein the third and fourth transducer elements are configured to transmit the third sonar return data and the fourth sonar return data, respectively, to the sonar signal processor to generate a plurality of second array sonar return data that correspond to a plurality of second receive beams that are each oriented at the different predetermined angles with respect to each other;
wherein the first, second, third, and fourth transducer elements are configured to transmit the first sonar return data, the second sonar return data, the third sonar return data, and the fourth sonar return data, respectively, to the sonar signal processor to be processed to generate a set of 3D sonar return data associated with the underwater environment by:
generating one or more second angles within each of the plurality of first receive beams by correlating the plurality of first array sonar return data and the plurality of second array sonar return data at each of the different predetermined angles, wherein the correlation is based on the predetermined distance, and wherein the second angle is perpendicular to the different predetermined angle of each corresponding first receive beam; and
generate a 3D image based on the generated set of 3D sonar return data.

19. The transducer assembly of claim 18, wherein the predetermined distance is a first predetermined distance, wherein the transducer array further comprises:

a third row of transducer elements comprises at least a fifth transducer element and a sixth transducer element;
wherein the fifth transducer element is configured to receive fifth sonar returns from the sonar pulses transmitted into the underwater environment and convert sound energy of the fifth sonar returns into fifth sonar return data;
wherein the sixth transducer element is configured to receive sixth sonar returns from the sonar pulses transmitted into the underwater environment and convert sound energy of the sixth sonar returns into sixth sonar return data;
wherein the third row of transducer elements is disposed adjacent the second row of transducer elements, such that the fifth transducer element is positioned in the housing at a second predetermined distance from the third transducer element and the sixth transducer element is positioned in the housing at the second predetermined distance from the fourth transducer element;
wherein the fifth and sixth transducer elements are configured to transmit the fifth sonar return data and the sixth sonar return data, respectively, to the sonar signal processor to process the fifth sonar return data and the sixth sonar return data to generate a plurality of third array sonar return data that correspond to a plurality of third receive beams that are each oriented at the different predetermined angles with respect to each other; and
wherein the second angle within each of the plurality of first receive beams is based on a correlation among the plurality of first array sonar return data, the plurality of second array sonar return data, and the plurality of third array sonar return data.

20. The transducer assembly of claim 19, wherein the first predetermined distance is different than the second predetermined distance.

21. The transducer assembly of claim 20, wherein the first predetermined distance is half the second predetermined distance.

22. The transducer assembly of claim 19, wherein the fifth transducer element is positioned in the housing at a third predetermined distance from the first transducer element and the sixth transducer element is positioned in the housing at the third predetermined distance from the second transducer element.

23. The transducer assembly of claim 18, wherein the first row and the second row are oriented horizontally, such that a first axis spanning the first transducer element and the second transducer element and a second axis spanning the third transducer element and the fourth transducer element are configured to be disposed perpendicular to a centerline of the watercraft.

24. The transducer assembly of claim 18, wherein the first row and the second row are oriented at least partially vertically, such that at least a component of a first axis spanning the first transducer element and the second transducer element and at least a component a second axis spanning the third transducer element and the fourth transducer element are configured to be disposed parallel to a centerline of the watercraft.

25. The transducer assembly of claim 18, wherein the first row of transducer elements further comprises a fifth transducer element configured to receive fifth sonar returns from the sonar pulses transmitted into the underwater environment and convert sound energy of the fifth sonar returns into fifth sonar return data, wherein the second row of transducer elements further comprises a sixth transducer element configured to receive sixth sonar returns from the sonar pulses transmitted into the underwater environment and convert sound energy of the sixth sonar returns into sixth sonar return data, wherein the fifth transducer element is configured to transmit the fifth sonar data to the sonar signal processor to process the fifth sonar return data with the first sonar return data and the second sonar return data to generate the plurality of first array sonar return data, and wherein the sixth transducer element is configured to transmit the sixth sonar data to the sonar signal processor to process the sixth sonar return data with the third sonar return data and the fourth sonar return data to generate the plurality of second array sonar return data.

26. The transducer assembly of claim 18, wherein each of the first row of transducer elements and the second row of transducer elements include more transducer elements than a number of rows of transducer elements.

27. The transducer assembly of claim 18, wherein the first transducer element is formed of a plurality of transducer elements electrically connected to act as the first transducer element.

28. The transducer assembly of claim 18, wherein the transducer array defines a substantially planar shape, such that each of the first transducer element, the second transducer element, the third transducer element, and the fourth transducer element are arranged on a plane.

29. The transducer assembly of claim 18, wherein the transducer array defines a receiving surface that corresponds to a receiving surface of the first transducer element, a receiving surface of the second transducer element, a receiving surface of the third transducer element, and a receiving surface of the fourth transducer element, wherein the receiving surface is curved such that the receiving surface of the first transducer element and the receiving surface of the third transducer element are configured to define different angles with respect to the surface of the body of water.

30. The transducer assembly of claim 29, wherein the receiving surface of the first transducer element and the receiving surface of the second transducer element define a same angle with respect to the surface of the body of water.

31. The transducer assembly of claim 18, wherein the transducer array defines a receiving surface that corresponds to a receiving surface of the first transducer element, a receiving surface of the second transducer element, a receiving surface of the third transducer element, and a receiving surface of the fourth transducer element, wherein the receiving surface is curved such that the receiving surface of the first transducer element and the receiving surface of the second transducer element are configured to define different angles with respect to the surface of the body of water.

32. The transducer assembly of claim 31, wherein the receiving surface of the first transducer element and the receiving surface of the third transducer element define a same angle with respect to the surface of the body of water.

33. The transducer assembly of claim 18, wherein the transducer array defines a receiving surface, and wherein the receiving surface is configured to be oriented downwardly and forwardly from the watercraft.

34. The transducer assembly of claim 18, wherein the transducer array defines a receiving surface, and wherein the receiving surface is configured to be oriented downwardly from the watercraft such that the receiving surface is configured to be oriented substantially perpendicular to the surface of the body of water.

35. A method of imaging an underwater environment comprising:

transmitting sonar pulses into a body of water from a housing mountable to a watercraft;

receiving, via a first transducer element of a first row of transducer elements in a transducer array, first sonar returns from sonar pulses transmitted into the water, wherein the transducer array is positioned within the housing and configured to be aimed at least partially downwardly from the watercraft, and wherein the first transducer element is configured to convert sound energy of the first sonar returns into first sonar return data;

receiving, via a second transducer element of the first row of transducer elements in the transducer array, second sonar returns from the sonar pulses transmitted into the underwater environment, wherein the second transducer element is configured to convert sound energy of the second sonar returns into second sonar return data;

receiving, via a third transducer element of a second row of transducer elements in the transducer array, third sonar returns from the sonar pulses transmitted into the underwater environment, wherein the third transducer element is configured to convert sound energy of the third sonar returns into third sonar return data;

receiving, via a fourth transducer element of the second row of transducer elements in the transducer array, fourth sonar returns from the sonar pulses transmitted into the underwater environment, wherein the fourth transducer element is configured to convert sound energy of the fourth sonar returns into fourth sonar return data;

wherein the first row of transducer elements is disposed proximate the second row of transducer elements such that the first transducer element is positioned in the housing at a predetermined distance from the third transducer element and the second transducer element is positioned in the housing at the predetermined distance from the fourth transducer element;

processing, via a sonar signal processor, the first sonar return data and the second sonar return data to generate a plurality of first array sonar return data that correspond to a plurality of first receive beams that are each oriented at different predetermined angles with respect to each other;

processing the third sonar return data and the fourth sonar return data to generate a plurality of second array sonar return data that correspond to a plurality of second receive beams that are each oriented at the different predetermined angles with respect to each other;

generating, based on the first sonar return data, the second sonar return data, the third sonar return data, and the fourth sonar return data, a set of 3D sonar return data associated with the underwater environment by:

generating one or more second angles within each of the plurality of first receive beams by correlating the plurality of first array sonar return data and the plurality of second array sonar return data at each of the different predetermined angles, wherein the correlation is based on the predetermined distance, and wherein the second angle is perpendicular to the different predetermined angle of each corresponding first receive beam; and
generating a 3D image based on the generated set of 3D sonar return data.

36. The method of claim 35, wherein the predetermined distance is a first predetermined distance, wherein the method further comprises:
receiving, via a fifth transducer element of a third row of transducer elements in the transducer array, fifth sonar returns from the sonar pulses transmitted into the underwater environment,
wherein the fifth transducer element is configured to convert sound energy of the fifth sonar returns into fifth sonar return data;
receiving, via a sixth transducer element of the third row of transducer elements in the transducer array, sixth sonar returns from the sonar pulses transmitted into the underwater environment,
wherein the sixth transducer element is configured to convert sound energy of the sixth sonar returns into sixth sonar return data;
wherein the third row of transducer elements is disposed adjacent the second row of transducer elements, such that the fifth transducer element is positioned in the housing at a second predetermined distance from the third transducer element and the sixth transducer element is positioned in the housing at the second predetermined distance from the fourth transducer element;
processing the fifth sonar return data and the sixth sonar return data to generate a plurality of third array sonar return data that correspond to a plurality of third receive beams that are each oriented at the different predetermined angles with respect to each other; and
determining the second angle within each of the plurality of first receive beams based on a correlation among the plurality of first array sonar return data, the plurality of second array sonar return data, and the plurality of third array sonar return data.

37. The method of claim 36, wherein the first predetermined distance is different than the second predetermined distance.

38. The method of claim 37, wherein the first predetermined distance is half the second predetermined distance.

39. The method of claim 36, wherein the fifth transducer element is positioned in the housing at a third predetermined distance from the first transducer element and the sixth transducer element is positioned in the housing at the third predetermined distance from the second transducer element.

40. The method of claim 35, wherein the first row and the second row are oriented horizontally, such that a first axis spanning the first transducer element and the second transducer element and a second axis spanning the third transducer element and the fourth transducer element are configured to be disposed perpendicular to a centerline of the watercraft.

41. The method of claim 35, wherein the first row and the second row are oriented at least partially vertically, such that at least a component of a first axis spanning the first transducer element and the second transducer element and at least a component a second axis spanning the third transducer element and the fourth transducer element are configured to be disposed parallel to a centerline of the watercraft.

42. The method of claim 35, further comprising
receiving, via a fifth transducer element of the first row of transducer elements in the transducer array, fifth sonar returns from the sonar pulses transmitted into the underwater environment,
wherein the fifth transducer element is configured to convert sound energy of the fifth sonar returns into fifth sonar return data;
receiving, via a sixth transducer element of the second row of transducer elements in the transducer array, sixth sonar returns from the sonar pulses transmitted into the underwater environment,
wherein the sixth transducer element is configured to convert sound energy of the sixth sonar returns into sixth sonar return data;
processing the fifth sonar return data with the first sonar return data and the second sonar return data to generate the plurality of first array sonar return data; and
processing the sixth sonar return data with the third sonar return data and the fourth sonar return data to generate the plurality of second array sonar return data.

43. The method of claim 35, wherein each of the first row of transducer elements and the second row of transducer elements include more transducer elements than a number of rows of transducer elements.

44. The method of claim 35, wherein the first transducer element is formed of a plurality of transducer elements electrically connected to act as the first transducer element.

45. The method of claim 35, wherein the transducer array defines a substantially planar shape, such that each of the first transducer element, the second transducer element, the third transducer element, and the fourth transducer element are arranged on a plane.

46. The method of claim 35, wherein the transducer array defines a receiving surface that corresponds to a receiving surface of the first transducer element, a receiving surface of the second transducer element, a receiving surface of the third transducer element, and a receiving surface of the fourth transducer element, wherein the receiving surface is curved such that the receiving surface of the first transducer element and the receiving surface of the third transducer element are configured to define different angles with respect to the surface of the body of water.

47. The method of claim 46, wherein the receiving surface of the first transducer element and the receiving surface of the second transducer element define a same angle with respect to the surface of the body of water.

48. The method of claim 35, wherein the transducer array defines a receiving surface that corresponds to a receiving surface of the first transducer element, a receiving surface of the second transducer element, a receiving surface of the third transducer element, and a receiving surface of the fourth transducer element, wherein the receiving surface is curved such that the receiving surface of the first transducer element and the receiving surface of the second transducer element are configured to define different angles with respect to the surface of the body of water.

49. The method of claim 48, wherein the receiving surface of the first transducer element and the receiving surface of the third transducer element define a same angle with respect to the surface of the body of water.

50. The method of claim 35, wherein the transducer array defines a receiving surface, and wherein the receiving surface is configured to be oriented downwardly and forwardly from the watercraft.

51. The method of claim 35, wherein the transducer array defines a receiving surface, and wherein the receiving surface is configured to be oriented downwardly from the watercraft such that the receiving surface is configured to be oriented substantially perpendicular to the surface of the body of water.

* * * * *